US011637878B2

(12) United States Patent
Piao et al.

(10) Patent No.: US 11,637,878 B2
(45) Date of Patent: Apr. 25, 2023

(54) SYSTEMS AND METHODS FOR CONFIGURING APPLICATION SOFTWARE

(71) Applicant: Citrix Systems, Inc., Fort Lauderdale, FL (US)

(72) Inventors: Jian Piao, Nanjing (CN); Jiang Xu, Nanjing (CN); Kuicheng Chen, Nanjing (CN)

( * ) Notice: Subject to any disclaimer, the term of this patent is extended or adjusted under 35 U.S.C. 154(b) by 0 days.

(21) Appl. No.: 17/363,338

(22) Filed: Jun. 30, 2021

(65) Prior Publication Data
US 2022/0385705 A1 Dec. 1, 2022

Related U.S. Application Data

(63) Continuation of application No. PCT/CN2021/096755, filed on May 28, 2021.

(51) Int. Cl.
*H04L 65/403* (2022.01)
(52) U.S. Cl.
CPC ................................ *H04L 65/403* (2013.01)
(58) Field of Classification Search
CPC .................................................... H04L 65/403
USPC .......................................................... 709/204
See application file for complete search history.

(56) References Cited

U.S. PATENT DOCUMENTS

| 2005/0125509 | A1* | 6/2005 | Ramachandran | ......... | G06F 8/61 709/229 |
| 2008/0091441 | A1* | 4/2008 | Flammer | ................ | G06Q 10/06 705/320 |
| 2009/0060469 | A1* | 3/2009 | Olague | .............. | H04N 21/6543 386/297 |
| 2009/0106347 | A1 | 4/2009 | Harwood | | |
| 2009/0260021 | A1* | 10/2009 | Haenel | .................. | G06F 9/5038 719/328 |
| 2012/0079477 | A1* | 3/2012 | Boss | ................... | G06F 9/44505 717/178 |
| 2013/0159993 | A1* | 6/2013 | Misovski | ................. | G06F 8/61 717/177 |
| 2018/0054420 | A1 | 2/2018 | Mindte | | |
| 2018/0121465 | A1 | 5/2018 | Bajaj | | |
| 2018/0217736 | A1 | 8/2018 | Nam | | |

(Continued)

FOREIGN PATENT DOCUMENTS

| CN | 101902490 A | 12/2010 |
| CN | 104601416 A | 5/2015 |

(Continued)

OTHER PUBLICATIONS

Office Action (Non-Final Rejection) dated Apr. 1, 2022 for U.S. Appl. No. 16/590,752 (pp. 1-12).

(Continued)

*Primary Examiner* — Zi Ye

(57) ABSTRACT

According to some embodiments, a method includes: receiving, by a computing device, data about one or more applications associated with users of a group, the group being one in which to share information amongst the users; identifying, by the computing device, an application common to at least a subset of users of the group based on the received data; and providing, by the computing device, settings to a client device of another user outside the subset of users, the client device to apply the settings to enable the another user to access the application in common with use of the client device.

19 Claims, 15 Drawing Sheets

(56) References Cited

U.S. PATENT DOCUMENTS

2019/0347107 A1 11/2019 Ma
2020/0358714 A1 11/2020 Singleton, IV

FOREIGN PATENT DOCUMENTS

CN 104780191 A 7/2015
CN 108551419 A 9/2018
CN 110166577 A 8/2019

OTHER PUBLICATIONS

International Search Report and Written Opinion for App. No. PCT/CN2021/096755, dated Mar. 1, 2022, 10 pages.
Notice of Allowance dated Feb. 4, 2021 for U.S. Appl. No. 16/404,007; 7 pages.
PCT International Search Report and Written Opinion dated Nov. 20, 2020 for International Application No. PCT/US2020/052399; 15 pages.
Jo, et al., "Automatic Generation of GUI for Smartphone IME by Classifying User Behavior Patterns;" 2015 7th International Conference of Soft Computing and Pattern Recognition (SoCPaR); Nov. 13, 2015; 4 pages.
Jain, et al., "Contextual Adaptive User Interface for Android Devices;" 2013 Annual IEEE India Conference (INDICON); Dec. 13, 2013; 5 pages.
Basu, et al., "Multi-user Adaptive Launcher for Android;" 2019 Twelfth International Conference on Contemporary Computing (IC3); Aug. 8, 2019; 6 pages.

\* cited by examiner

```
┌─────────────────────────────────────────────┐
│ Receive data about one or more applications │
│   associated with users of a group          │
│                  1102                       │
└─────────────────────────────────────────────┘
                      │
                      ▼
┌─────────────────────────────────────────────┐
│ Identify an application in common to at     │
│ least a subset of users of the group based  │
│           on the received data              │
│                  1104                       │
└─────────────────────────────────────────────┘
                      │
                      ▼
┌─────────────────────────────────────────────┐
│ Provide settings to a client device of      │
│     another user outside the subset of users│
│                  1106                       │
└─────────────────────────────────────────────┘
```

Collect, by a first client device associated with a user of a group, data about one or more applications accessible by the first client device
1302

Send the data to a server device configured to identify an application common to at least a subset of users of the group based on the sent data
1304

Receive, by a second client device of another user outside the subset of users, settings from the server device, settings
1306

Apply, by the second client device, the settings to enable the another user to access the application in common with use of the second client device
1308

*FIG. 13*

SYSTEMS AND METHODS FOR CONFIGURING APPLICATION SOFTWARE

CROSS REFERENCE TO RELATED APPLICATION

This application is a continuation of and claims the benefit of PCT Patent Application No. PCT/CN2021/096755 filed on May 28, 2021 in the English language in the State Intellectual Property Office and designating the United States, the contents of which are hereby incorporated herein by reference in its entirety.

BACKGROUND

Different users associated with the same organization may tend to utilize some or all of the same software applications. For example, a company may require or encourage its employees to use the same email application, web browser, word processor, etc. A new employee may be provided a company-owned device with certain applications pre-installed, or may be asked to install these applications on their personal device managed by the company. Within a given organization, different groups of users may use different software applications. For example, a group of developers may use an issue tracking application, such JIRA, whereas a group of designers may use a graphic design application, such as PHOTOSHOP. Other applications, such as printer drivers and virtual private network (VPN) clients may be used by most of if not all users within an organization. A particular application may include many different configuration settings that affect the behavior of the application.

SUMMARY

The application configuration settings used on a particular computing device can affect both device performance (e.g., in terms of storage and processing resources consumed by the application, device security, etc.) and user productivity (e.g., in terms of how much time it takes a user to complete various tasks us an application). For example, an employee of a large corporation may receive hundreds or even thousands of emails each day. Within an email application, the user can define rules for automatically classifying and processing messages by importance, subject matter, or other criteria, thereby saving the user from having to manually process such messages. As another example, a user may configure a web browser to delete cached data, cookies, saved login information, and other data after a certain amount of time (or to prevent such data from being stored at all) so as to reduce storage usage and/or to reduce the impact of a potential data breach. As another example, a user can create bookmarks to efficiently access websites/apps within a browser.

Having users manually configuring applications on their computing device can be time consuming and may lead to inefficiencies as some users (e.g., new employees) may not know which configuration settings result can improve device performance and user productivity. In many situations, it can be beneficial for multiple users within an organization to share application configuration settings, particularly users with similar job responsibilities, roles, etc. Embodiments of the present disclosure provide automatic configuration of application software based on configuration settings used by other users within the organization and can, for example, improve user productivity and device performance.

According to one aspect of the present disclosure, a method can include: receiving, by a computing device, data about one or more applications associated with users of a group, the group being one in which to share information amongst the users; identifying, by the computing device, an application common to at least a subset of users of the group based on the received data; and providing, by the computing device, settings to a client device of another user outside the subset of users, the client device to apply the settings to enable the another user to access the application in common with use of the client device.

In some embodiments, the method can further include: receiving, by the computing device, information describing one or more lists of users from another computing device; and identifying, by the computing device, the group as being one in which to share information amongst the users and the users of the group based on the information received from the another computing device. In some embodiments, the receiving of the one or more lists of users and information describing the one or more lists of users may include receiving one or more distribution lists from a communication service. In some embodiments, the identifying of the group can be based on a name of one of the one or more lists of users.

In some embodiments, the method can further include: receiving, by the computing device, information describing an organization of users from another computing device; and identifying, by the computing device, the group as being one in which to share information amongst the users and the users of the group based on the information received from the another computing device. In some embodiments, the receiving of the information describing the organization of users may include receiving an organization graph from a teams service.

In some embodiments, the method can further include: identifying, by the computing device, the settings as being settings of the application common to the at least a subset of users of the group based on the received data; and determining that the at least a subset of users includes at least a threshold number of users, wherein the providing of the settings to the client device of the another user is in response to the determining. In some embodiments, the method can further include: receiving, by the computing device, an input approving the settings for distribution, wherein the providing of the settings to the client device of the another user is in response to the input.

In some embodiments, the method can further include: identifying, by the computing device, other settings as being settings of the application common to the at least a subset of users of the group based on the received data; receiving an input rejecting the other settings for distribution; and in response to the input, updating the database to prevent the other settings from being provided to the client device of the another user. In some embodiments, the receiving of the data about one or more applications associated with the users of the group may include receiving settings for the one or more applications collected by an agent running on client devices assigned to the users of the group.

According to another aspect of the present disclosure, another method can include: collecting, by a client device, data about one or more applications accessible by the client device, the client device associated with a user of a group, the group being one in which to share information amongst the users; and sending, by the client device, the data to a server device, the server device configured to: identify an application common to at least a subset of users of the group based on the sent data, and provide settings to another client device of another user outside the subset of users, the another client device to apply the settings to enable the another user to access the application in common with use of the another client device.

In some embodiments of the other method, the server device may be further configured to: identify the settings as being settings of the application common to the at least a subset of users of the group based on the sent data; and determine that the at least a subset of users includes at least a threshold number of users, wherein the providing of the settings to the another client device of the another user is in response to the determining. In some embodiments, the other method can further include: receiving, by the client device and from the server device, other settings associated with another application common to at least another subset of the users; applying the other settings to the another application accessible by the client device to enable the user to access the another application in common with use of the client device. In some embodiments, the other method can further include: receiving, by the client device, an input approving the other settings, wherein the applying of the other settings to the client device is in response to the input. In some embodiments of the other method, collecting the data about one or more applications accessible by the client device may be performed by an agent running on the client device.

According to another aspect of the present disclosure, an apparatus can include a processor and a non-volatile memory storing computer program code that, when executed on the processor, can cause the processor to execute a process. The process can include: receiving, by a computing device, data about one or more applications associated with users of a group, the group being one in which to share information amongst the users; identifying, by the computing device, an application common to at least a subset of users of the group based on the received data; and providing, by the computing device, settings to a client device of another user outside the subset of users, the client device to apply the settings to enable the another user to access the application in common with use of the client device.

In some embodiments, the process may further include: receiving, by the computing device, information describing one or more lists of users from another computing device; and identifying, by the computing device, the group as being one in which to share information amongst the users and the users of the group based on the information received from the another computing device. In some embodiments, the receiving of the one or more lists of users and information describing the one or more lists of users may include receiving one or more distribution lists from a communication service. In some embodiments, the identifying of the group can be based on a name of one of the one or more lists of users. In some embodiments, the process may further include: receiving, by the computing device, information describing an organization of users from another computing device; and identifying, by the computing device, the group as being one in which to share information amongst the users and the users of the group based on the information received from the another computing device.

BRIEF DESCRIPTION OF THE DRAWINGS

The manner of making and using the disclosed subject matter may be appreciated by reference to the detailed description in connection with the drawings, in which like reference numerals identify like elements.

FIGS. 11-13 are flow diagrams of illustrative processes that can be used for automatically configuring application software, according to some embodiments.

The drawings are not necessarily to scale, or inclusive of all elements of a system, emphasis instead generally being placed upon illustrating the concepts, structures, and techniques sought to be protected herein.

DETAILED DESCRIPTION

Figure 1:
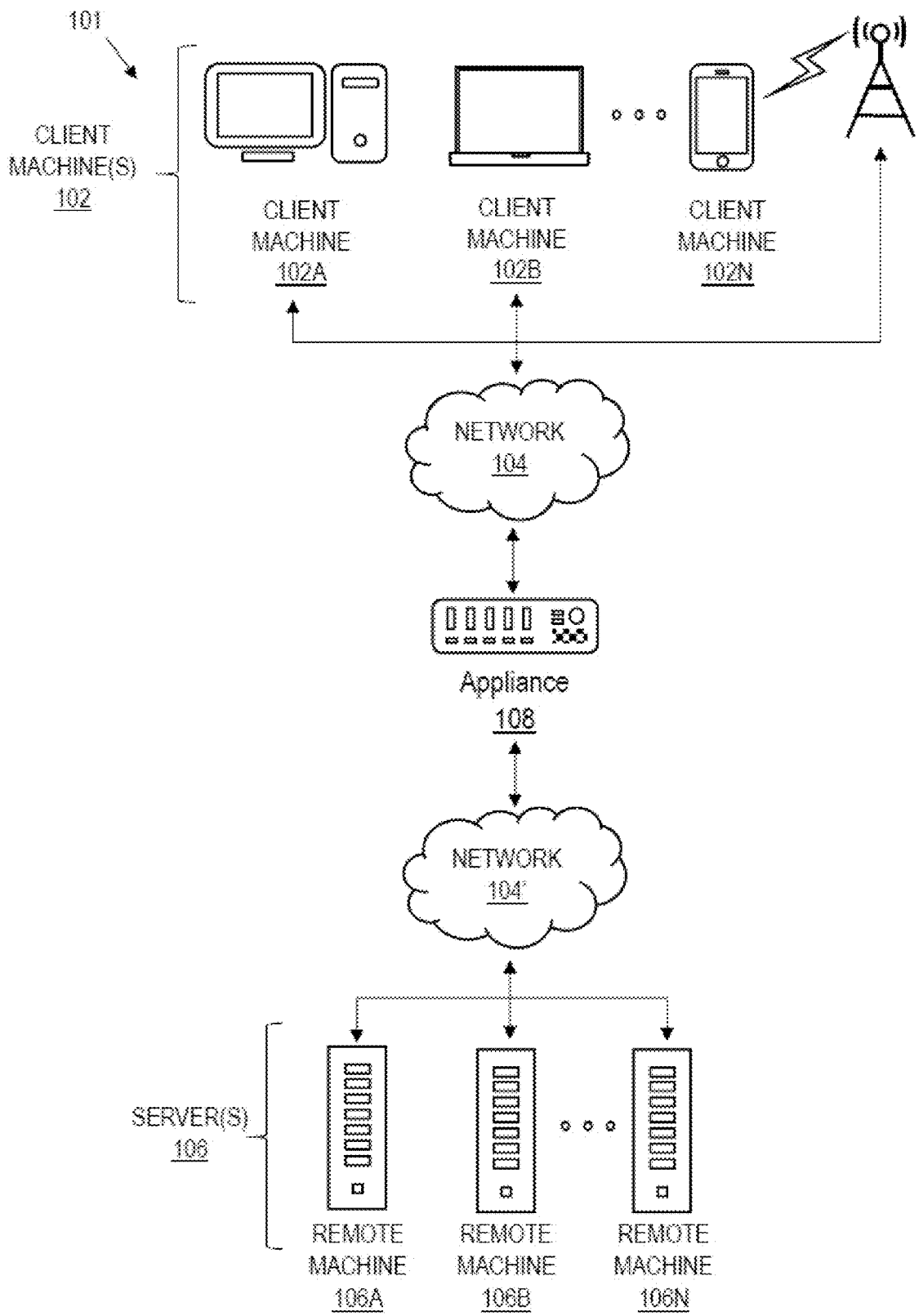
FIG. 1 is a diagram illustrating an example network environment of computing devices in which various aspects of the disclosure may be implemented, in accordance with an embodiment of the present disclosure.

Referring now to FIG. 1, shown is an example network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
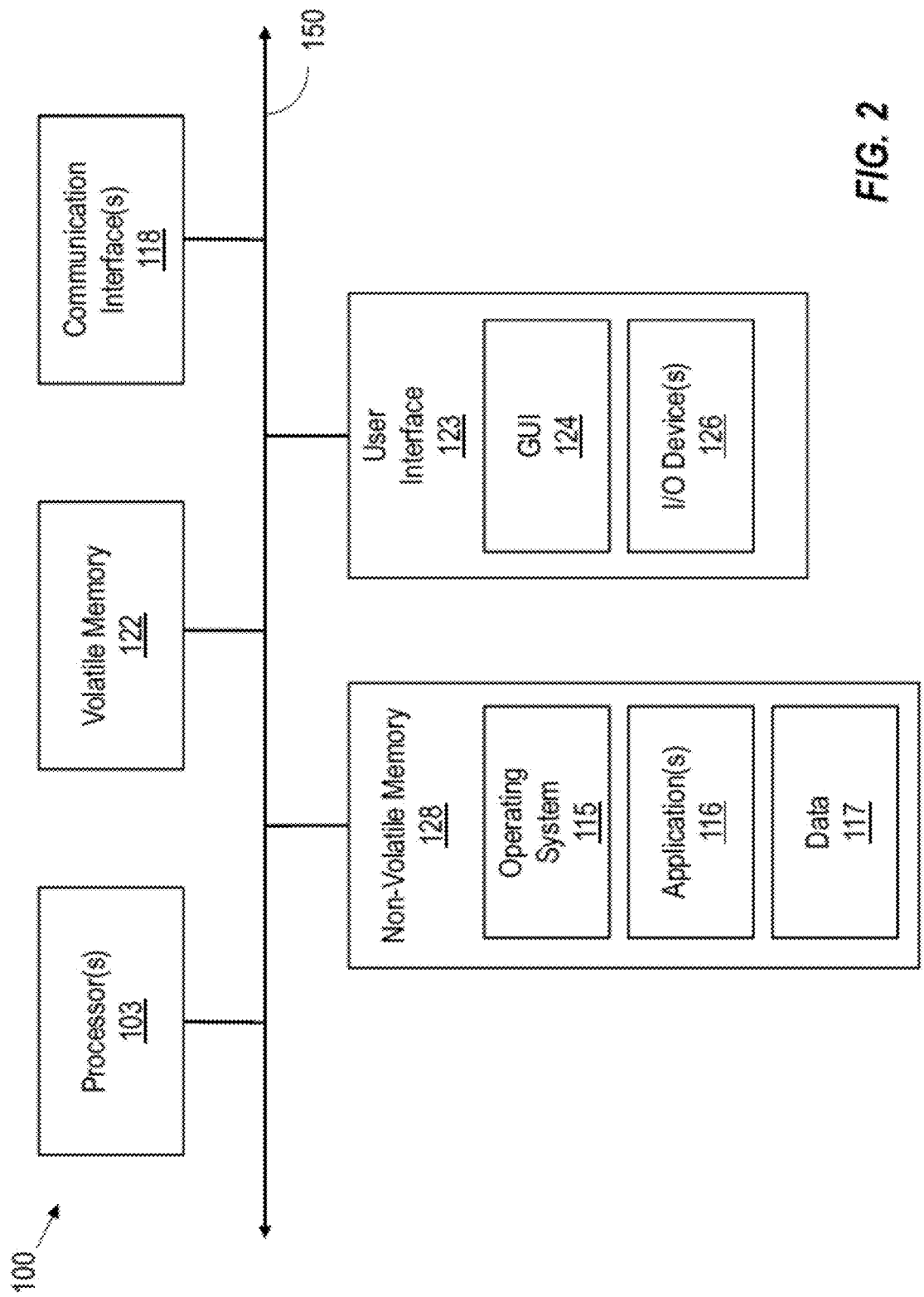
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an example client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
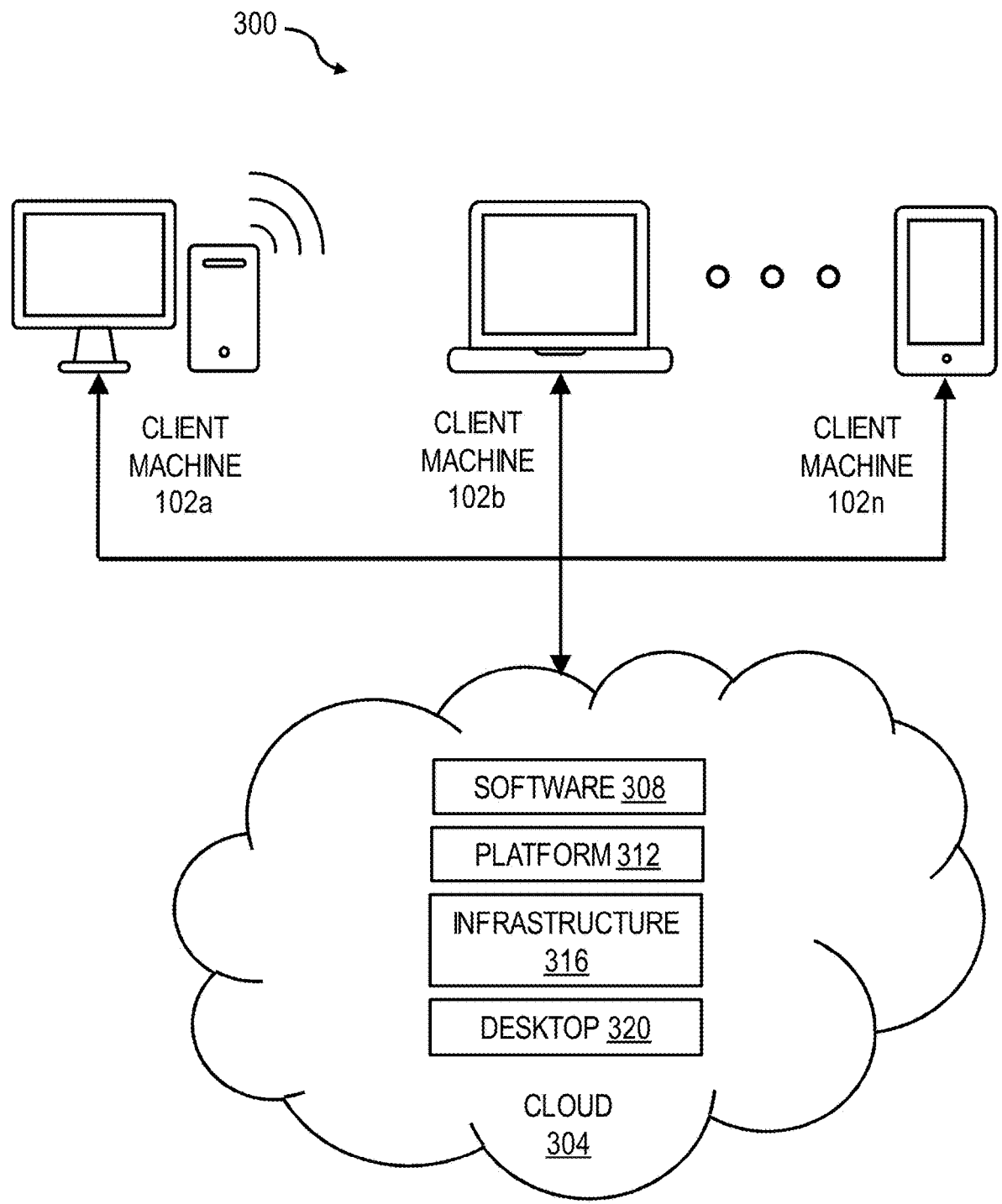
FIG. 3 is a diagram of a cloud computing environment in which various aspects of the concepts described herein may be implemented.

Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 102a-102n (such as those described above) are in communication with a cloud network 304. The cloud network 304 may include back-end platforms, e.g., servers, storage, server farms or data centers. The users or clients 102a-102n can correspond to a single organization/tenant or multiple organizations/tenants. More particularly, in one example implementation the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 102. In some embodiments, the cloud computing environment 300 can include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
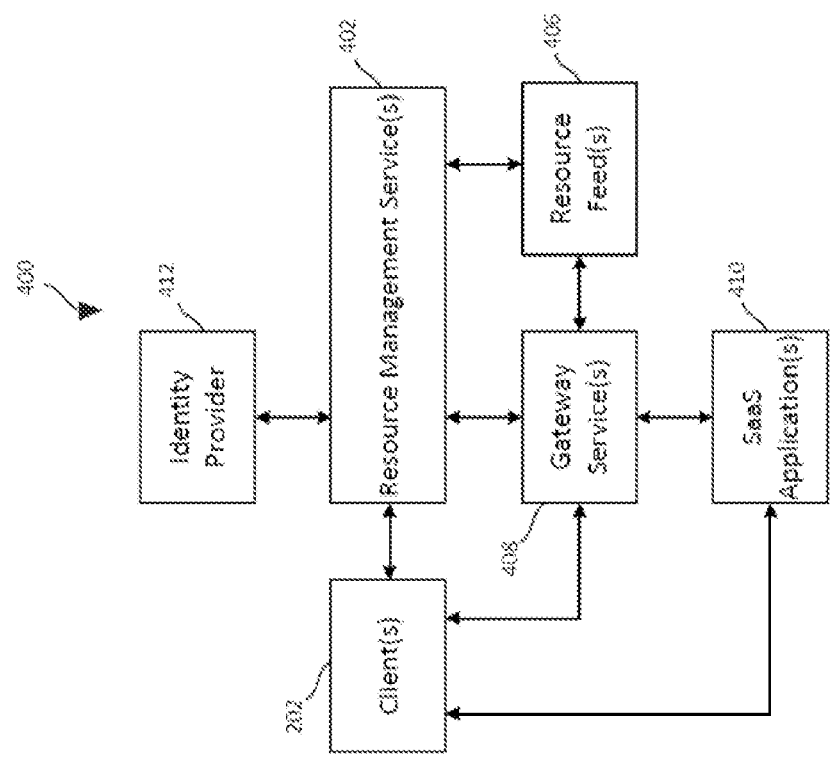
FIG. 4A is a block diagram of an example system in which resource management services may manage and streamline access by clients to resource feeds (via one or more gateway services) and/or software-as-a-service (SaaS) applications.

FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
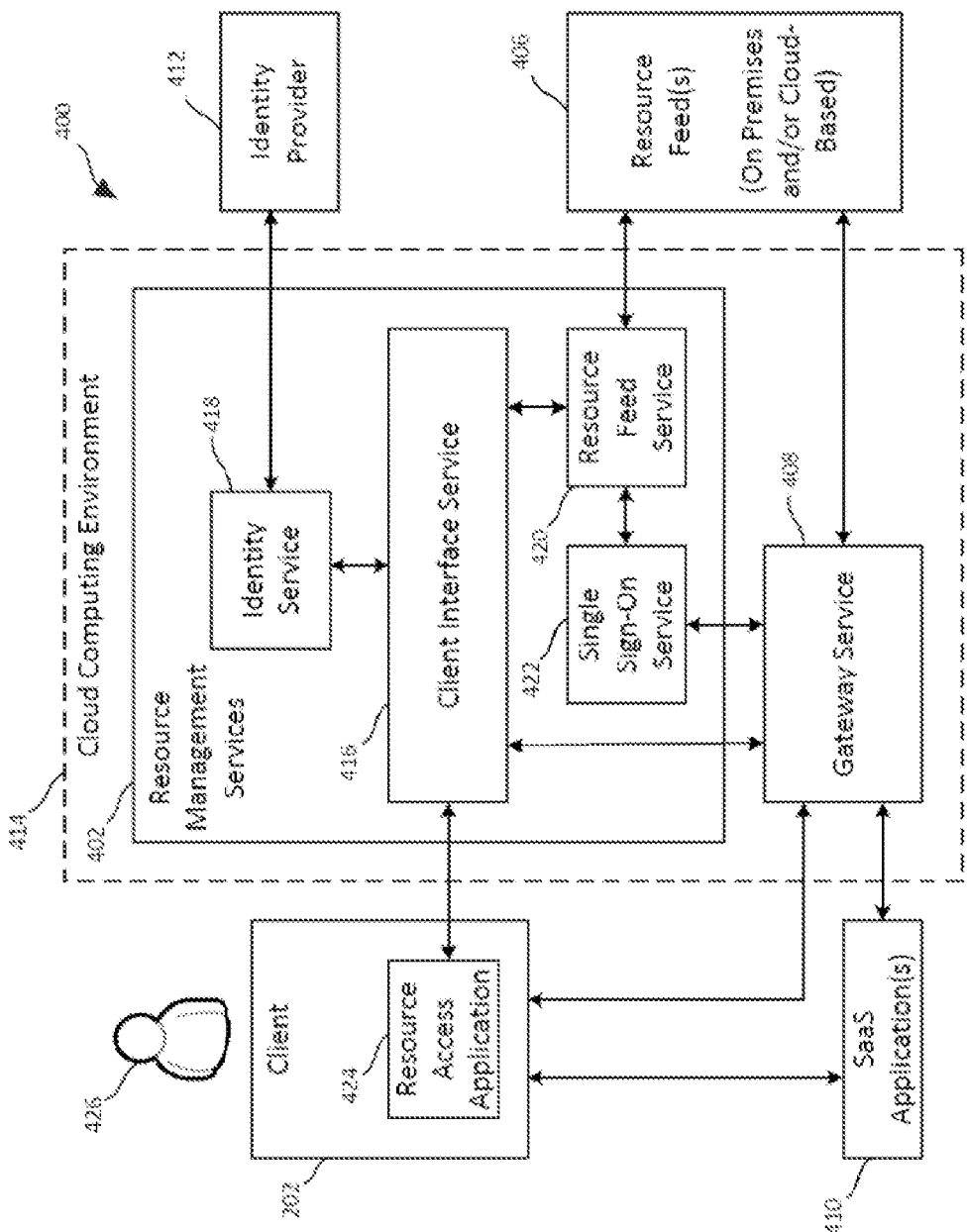
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources-SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
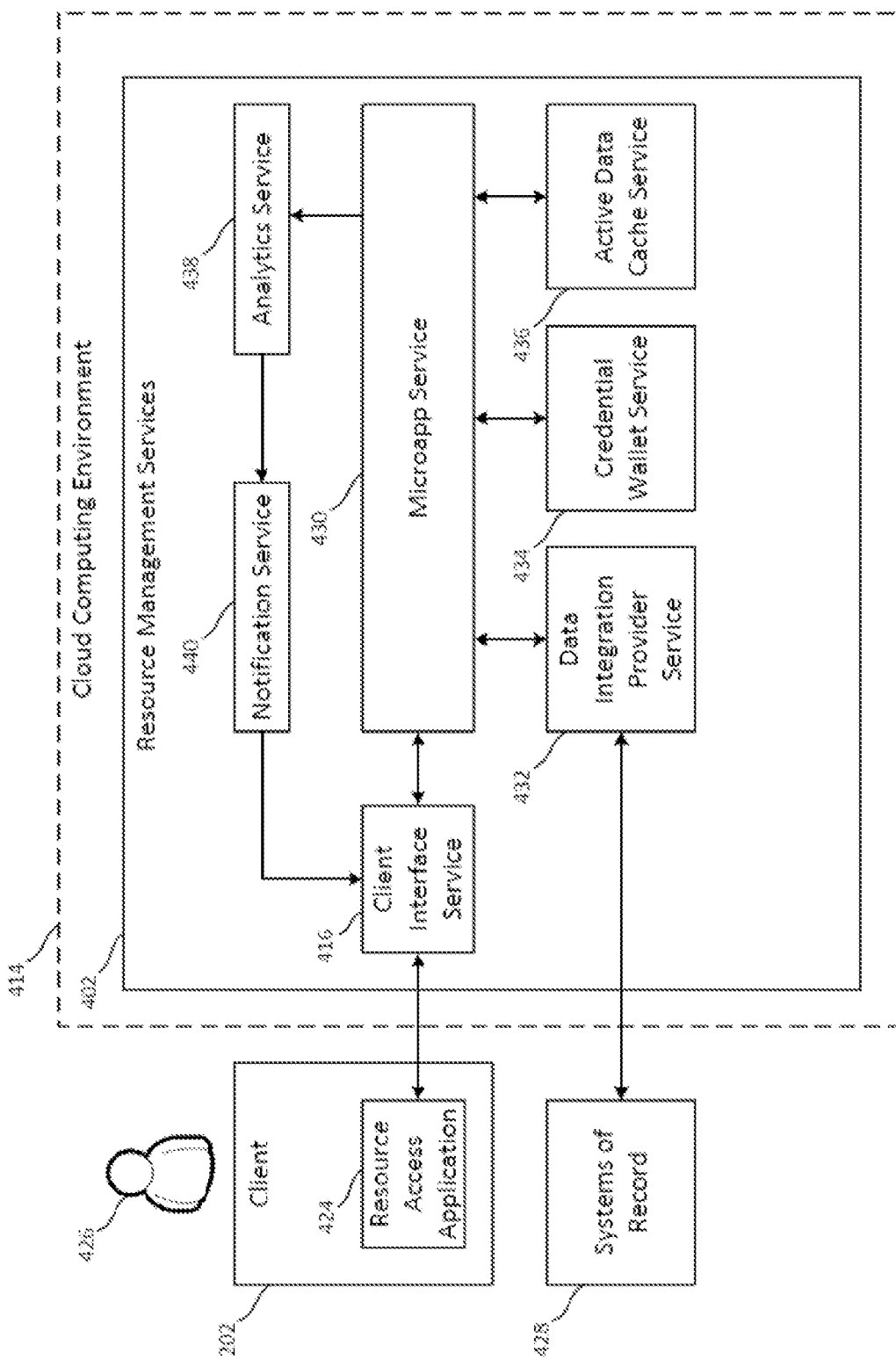
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 432 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information being sought.

Figure 5:
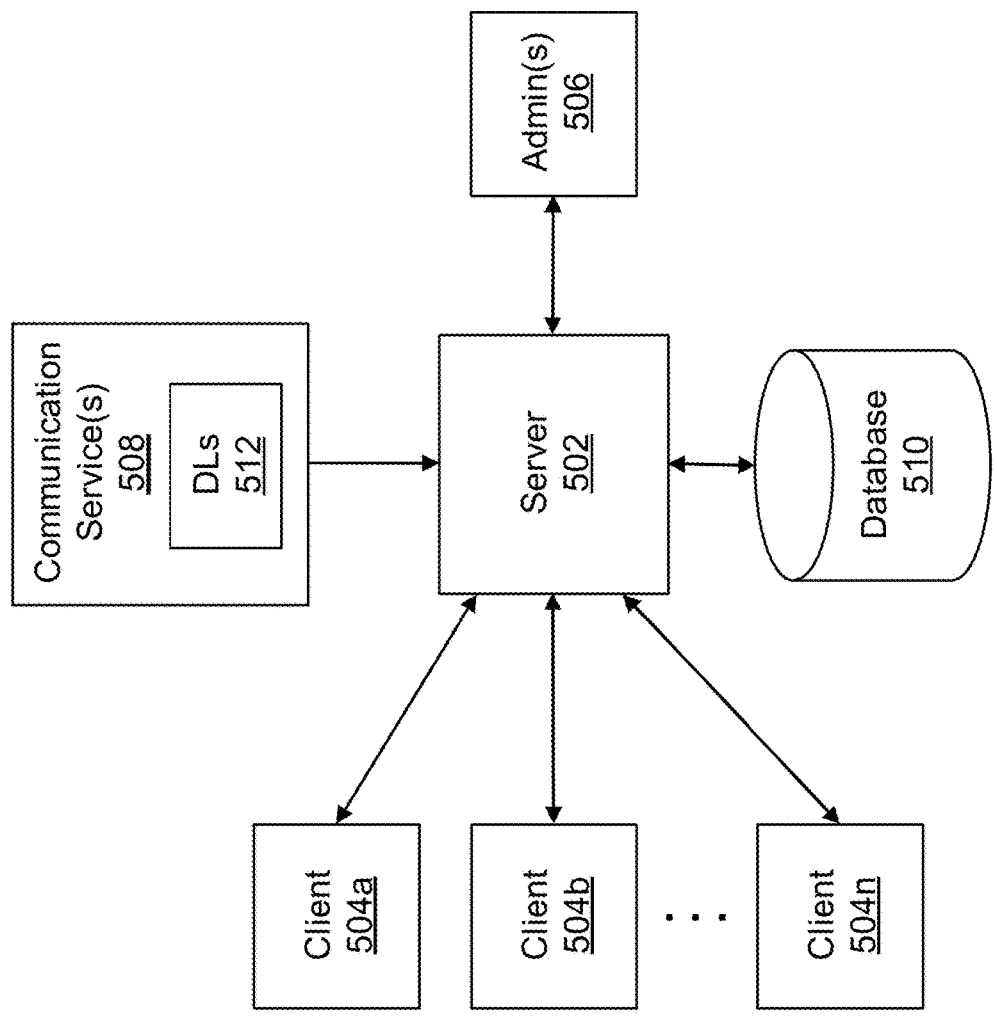
FIG. 5 is block diagram of an illustrative system for configuration of application software, according to some embodiments.

FIG. 5 shows an example of a system for configuration of application software, according to embodiments of the present disclosure. An illustrative system 500 includes a server 502 configured to communicate with a plurality of client devices 504*a*, 504*b*, . . . , 504*n* (504 generally), one or more administrator devices 506, and one or more communication services 508. Server 502 can include any type of server to enable the configuration of applications installed on, or otherwise accessible by, clients 504 according to the present disclosure. Communications services 508 can include any services that provide communication between users of an organization. In some embodiments, communication services 508 can include one or more mail services. Server 502 can include or otherwise have access to a database 510 that stores information about application configuration. Communication between different components within system 500 can occur over one or more to wireless or wired computer networks including, but not limited to, local-area networks (LANs), metropolitan area networks (MANs), wide area networks (WANs), wireless local-area networks (WLAN), primary public networks, primary private networks, cellular networks, Wi-Fi (i.e., 802.11) networks, Bluetooth networks, and Near Field Communication (NFC) networks.

System 500 may provide services for one or more organizations and one or more associated users. A given client device (or "client") 504 may be assigned to or otherwise associated with a particular user. Clients 504 can include smartphones, tablet computers, laptop computers, desktop computers, or other computing devices configured to run various types of application software. As used herein, the terms "application software" and "applications" can refer to any software that can be installed and run on a computing device or otherwise accessed by a computing device, including user-level applications—such as email applications, web browsers, word processors, etc.—and system-level applications—such as device drivers, single sign-on (SSO) agents, virtual private network (VPN) clients, etc. The concepts and structures sought to be protected herein may also be used to configure applications hosted by remote servers, including but not limited to SaaS applications. A particular client 504 can have one or more accessible applications and different clients 504 may have different sets of accessible applications. For example, a first client 504*a* may have access to OUTLOOK and FIREFOX, whereas a second client 504*b* may have access to OUTLOOK and CHROME. In practice, a particular client 504 may have access to many different applications (e.g., dozens or hundreds of different applications).

While the structure and operation of clients 504 are described in detail below, a brief overview is given here. A client 504 can include an agent configured to collect settings for different configurations of one or more applications accessible thereby, to filter, transform, or otherwise process the configuration settings, and to send the processed configuration settings to server 502. A "configuration setting" or "application configuration setting" is any parameter or data of an application to which can or otherwise enables definition/adjustment of a configuration of a client and many also refer to a value of that parameter or attribute. The agent may also be configured to receive one or more configurations from server 502 and to apply the configurations to the applications accessible by the client device (e.g., by modifying configuration files associated with those applications). A plurality of configurations may form a collection for a particular application that can be generated (e.g., by server 502) based on analysis of configuration settings collected from multiple different clients (e.g., clients 504), as will be described in detail below. An illustrative implementation of a client that can be used within system 500 is described below in the context of FIG. 6.

Within an organization, users may be associated with (or "belong to") one or more groups. For example, a company may organize its employees by sector, division, office, department, team, project, role, and/or other organizational units or groups. A given user may be associated with a single group, multiple groups, or no groups at all. For example, a software developer working on mobile application named "Project X" may belong to an "Engineering" department, a "Mobile Development" team, a "Project X" team, and a "Software Developer" role. Each of these are examples of "groups" for the purpose of this disclosure. As another example, employees that work in the same office, region, country, etc. may be treated as belonging to the same group. In some embodiments, a group can be any collection of users within an organization amongst which information is shared. For ease of explanation, a client 504 is said to belong to a particular group when it assigned to, operated by, or otherwise associated with a user that belongs to the group.

An organization may create or define distribution lists (sometimes referred to as "mailing lists") to facilitate communication between users within particular groups. In the embodiment of FIG. 5, distribution lists (DLs) 512 can be defined within a communication service 508, such as EXCHANGE. A particular DL 512 can include a list name (e.g., "Engineering"), information about the users that belong to the list (e.g., names and email addresses of the users), information about a user that manages or "owns" the list (e.g., the name of the DL owner), and an email address or alias (e.g., "engineering@acme.com") that can be used to send messages to the entire group of users. Communication services 508 can provide an API or other type of interface for retrieving information about DLs 512 defined by one or more organizations. An example of such an API is EXCHANGE WEB SERVICES (EWS) provided by EXCHANGE.

Server 502 can enable the configuration of application software accessible by client 504 using structures and techniques described in detail below. Briefly, server 502 can collect application configuration settings from one or more clients 504 associated with a particular group, analyze the collected settings to identify settings that are commonly used within the group, and then provide the commonly used settings to other clients 504 within the group. In this way, server 502 can enable different users within the same group to access various applications on their devices in a common manner. As previously discussed, this can lead to improved user productivity and device performance compared to having individual users manually configure the applications. Server 502 can retrieve information about DLs 512 from the one or more communication services 508 and use the DL information to identify groups of users for the purpose of analyzing collected application configuration settings and generating configurations. Server 502 may store and retrieve information related to groups, collected configuration settings, and configurations within database 510. An illustrative implementation of server 502 is described below in the context of FIG. 7.

In some embodiments, server 502 may provide an interface that administrator devices 506 (i.e., users of administrator devices) can use to review configurations generated by server 502. Administrator devices 506 can include smartphones, tablet computers, laptop computers, desktop computers, or other types of computing devices. Administrator devices 506 may be assigned to, operated by, or otherwise associated with users that have permission to manage clients 504 associated with an organization and/or applications accessible thereby. In some embodiments, an administrator device 506 can include a web browser configured to display a web interface (e.g., one or more web pages) provided by server 502 for reviewing configurations. In some embodiments, an administrator device 506 can run an application configured to retrieve configurations from server 502 via an API (e.g., a REST-based API) and to display the configurations for review within a UI provided by the application. Examples of UIs for reviewing configurations are shown and described in the context of FIGS. 10 and 10A.

In some embodiments, server 502 may be hosted within a cloud computing environment, such as cloud computing environment 414 of FIGS. 4A, 4B. In some embodiments, server 502 may be implemented as part of a resource management service, such as resource management service 402 of FIGS. 4A-4C. In some embodiments, a client 504 may be substantially similar to client machine 102 described above in the context of FIGS. 1 and 3, computing device 100 described above in the context of FIG. 2, and/or client 202 described above in the context of FIGS. 4A-4C.

Figure 6:
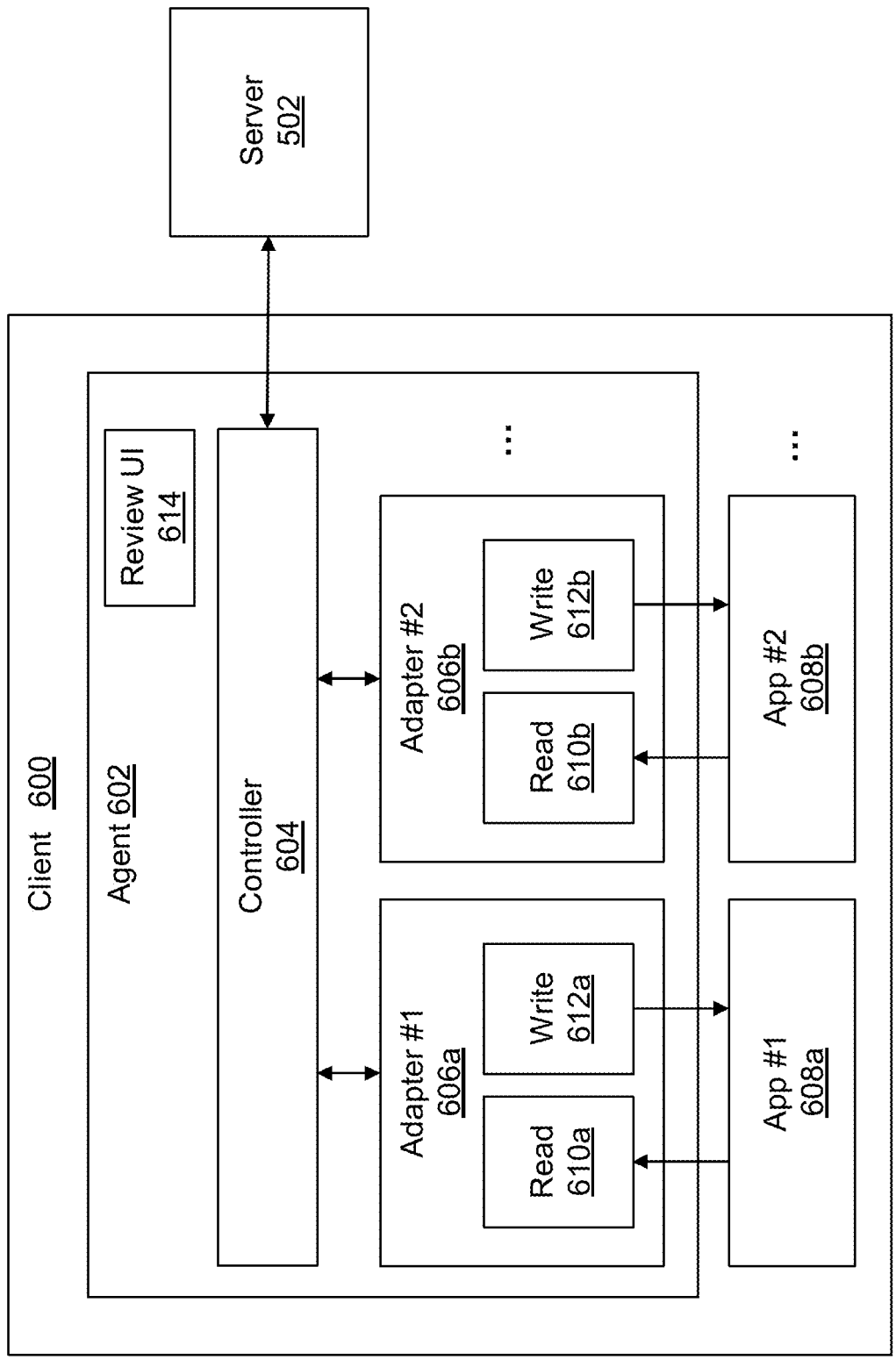
FIG. 6 is block diagram of an illustrative client that can be provided within the system of FIG. 5, according to some embodiments.

FIG. 6 shows an example of a client 600 that can be provided within a system for configuration of application software (e.g., system 500 of FIG. 5). For example, client 600 may be the same as or similar to a client 504 in FIG. 5. Illustrative client 600 can include an agent 602 and one or more applications 608a, 608b, etc. (608 generally). Applications 608 can include user-level applications and system-level applications installed on and configured to run on client 600 or otherwise accessible by client 600. While two applications 608a, 608b and are shown in FIG. 6, the disclosed structures and techniques can be used with clients having any number of applications. In some embodiments, agent 602 may be implemented within a resource access application, such as resource access application 424 of FIGS. 4C and 4C. For example, agent 602 may be provided a part of a CITRIX WORKSPACE application. In some embodiments, agent 602 may have administrative/superuser privileges on client 600.

Agent 602 can include a controller 604 and one or more adapters 606a, 606b, etc. (606 generally). Adapters 606 may provide an interface between controller 604 and individual applications 608 accessible by the client 600 so as to enable controller 604 to read and write configuration settings for applications 608. Various different adapters 606 can be included within, or otherwise accessible to, agent 602 to enable agent to read and write configuration for various different applications and/or types of applications. In more detail, a particular adapter 606 may be configured to read configuration settings from, and write configuration settings to, a corresponding application 608 accessible by client 600. In the example of FIG. 6, a first adapter 606a may be configured to read/write configuration for a first application 608a and a second adapter 606b may be configured to read/write configuration for a second application 608b. In some embodiments, agent 602 can include different adapters 606 for different applications 608 accessible by a device. In some embodiments, a particular adapter 606 may be configured to read/write configuration for multiple different applications 608. Agent 602 can include adapters 606 for many different applications (e.g., dozens or hundreds of different applications) that are commonly used within a given organization or across many different organizations.

As illustrated in FIG. 6, adapters 606 can include separate modules for reading and writing application configuration settings. For example, first adapter 606a includes a first read module 610a configured to read configuration settings from first application 608a and a first write module 612a configured to write configuration settings to first application 608a. Likewise, second adapter 606b includes a second read module 610b configured to read configuration settings from second application 608b and a second write module 612b configured to write configuration settings to first application 608b. As used herein, the term "write" when referring to application configuration can refer to both modifying existing configuration settings for an application and adding new configuration settings for an application.

The mechanism used by adapters 606 for reading/writing application configuration settings can vary according to the design and capabilities of applications 608 and of client 600. For example, on desktop and laptop computers, many applications to store configuration settings in one or more configuration files (e.g., INI files, properties files, XML files, JSON files, YAML files, or other text-based or binary file formats) accessible using system calls provided by the operating system (OS). Thus, a particular adapter 606 may include a library, or a set of libraries, for reading and writing one or more configuration file formats. As another example, some mobile and tablet device platforms isolate applications into separate "sandboxes" (e.g., using containers) such that an application's configuration files are inaccessible from outside that application. In this case, an adapter 606 may use an application programming interface (API) provided by an application (e.g., a SaaS application or another type of application hosted remotely, or a locally installed application) to read and write configuration settings.

Controller 604 is configured to communicate with server 502 (e.g., via one or more computer networks) and to interface with applications 608 using adapters 606. In some embodiments, controller 604 can discover applications 608 accessible by client 600. For example, controller 604 may query a registry of installed applications maintained by the client's OS. As another example, controller 604 may scan one or more directories/folders within the client's file system to discover installed applications (e.g., the "AppData" folder on WINDOWS or the "Applications" folder on MACOS). As another example, controller 604 may retrieve a list of applications accessible to client 600 from a server (e.g., server 502) that maintains a registry of which applications are installed or otherwise accessible on which clients for an organization. In some embodiments, agent 602 may include or otherwise access a list of applications for which it is capable of reading/writing configuration settings (referred to herein as "supported applications"). The supported applications may correspond to the set of applications for which there are corresponding adapters 606. Controller 604 can compare the set of accessible applications to the list of supported applications to determine which applications accessible by client 600 it is capable of reading/writing configuration settings for (referred to herein as "configurable applications"). For example, controller 604 may compute an intersection of the accessible applications and supported applications to generate a list of configurable applications. In the example of FIG. 6, both applications 608a, 608b accessible by client 600 are configurable because agent 602 includes corresponding adapters 606a, 606b. In other examples there may be applications accessible by a particular client that are not configurable.

Controller 604 can collect configuration settings defined by one or more of the configurable applications 608 using adapters 606 and send the collected configuration settings to server 502. In some embodiments, this may be done in response to a request sent from server 502 to client 600. In some embodiments, controller 604 may collect configuration settings in response to an input, such as a user launching or logging into an application on the client 600 (e.g., a resource access application) or the user modifying one or more application configuration settings on the client 600 (e.g., controller 604 may receive an OS notification that a change was made to a file/directory where application configurations are stored, or it may scan for such changes on a regular basis). In some embodiments, controller 604 may collect configuration settings periodically, e.g., hourly, daily, or weekly.

To collect application configuration settings, controller 604 can instantiate adapters 606 for one or more (e.g., all) of the configurable applications 608 and instruct the instantiated adapters 606 to read configuration settings therefrom. For example, controller 604 may send instructions to one or more read modules 610 to collect application configuration settings. In some embodiments, the adapters 606 may be configured to convert (e.g., normalize) configuration settings from an application-specific format (e.g., XML or binary) into a common format (e.g., JSON) such that controller 604 can collect configurations settings for several different applications in the common format. Controller 604 can send the normalized configuration settings for the one or more configurable applications 608 to server 502 for comparison with application configurations settings collected from other clients, as discussed in detail below. Controller 604 can send identifiers (e.g., application identifiers, such as application names) along with configuration settings such that server 502 can identify the applications from which the configuration settings were collected. Controller 604 can also send information identifying client 600 or a user thereof.

In some embodiments, particular adapters 606 may be configured to detect configuration settings that include sensitive information—such as confidential or personal information—and prevent such settings from being collected (i.e., from being collected by controller 604 and/or from being sent to server 502). In some embodiments, an adapter 606 may include, or otherwise access, a list of configuration settings for an application that are known to include (or potentially include) sensitive information. For example, an adapter 606 that collects settings for a web browser may prevent saved login credentials from being collected. An adapter 606 can use this list to prevent such settings from being collected. In some embodiments, controller 604 may include, or otherwise access, a list of applications that are known to include (or potentially include) sensitive information and may determine not to collect any configuration settings from such applications. For example, controller 604 may determine not to collect configuration settings from certain messaging applications, such as WECHAT, and certain social applications, such as FACEBOOK. In some embodiments, an adapter 606 and/or controller 604 may identify and exclude sensitive information using pattern matching (e.g., using regular expressions that encode string formats used to represent certain types of represent sensitive information).

Controller 604 can receive one or more configurations from server 502 and write (or "apply") those settings to one or more configurable applications 608 accessible by client 600. For example, server 502 may identify certain application configuration settings that are commonly used on clients associated with or otherwise assigned to a particular group and may send those settings to other clients associated with or assigned to that group (e.g., client 600) as configurations. A configuration received by client 600 can include information identifying an application (e.g., an application name) and one or more configuration settings for the application. Controller 604 can receive a configuration from server 502 in response to an input or event. For example, controller 604 may detect the first time a user launches an application and, in response, may send a request to server 502 requesting a configuration for that application. As another example, controller 604 may request configurations when a user logs into the client 600 or into an application accessible therefrom (e.g., a resource access application).

In some embodiments, server 502 may be aware of which configurable applications 608 are accessible by client 600 and may send only configuration settings for those applications to client 600. In some embodiments, server 502 may send many (e.g., all) configurations associated with a group of which client 600 is a member, and controller 604 may determine which configuration can be applied based on knowledge of the configurable applications 608 accessible by client 600. To apply a configuration, controller 604 can instantiate a corresponding adapter 606 and instruct the adapter 606 to write the corresponding configuration settings thereto. For example, controller 604 may send instructions to one or more modules (e.g., write modules) 612 to apply/write the configuration settings.

A particular application 608 may have many different configuration settings and a configuration received from server 502 may include a subset of those settings (e.g., the subset of configuration settings that are commonly used on other clients within the same group). In this case, a corresponding adapter 606 may merge the configuration settings for an application 608 with other configuration settings defined on client 600 for the application 608. For example, if a particular application 608 stores its configuration in an INI file, the adapter 606 may read the INT file, identify line or lines where the configuration settings were previously defined, and overwrite those lines with the settings. If the configuration settings were not previously defined in the INI file, the adapter 606 may append the configuration settings to the file. A similar approach can be used with other configuration file forms, such as JSON files, XML files, etc. In some embodiments, a configuration may be provided as a complete configuration for an application and an adapter 606 may entirely overwrite the application's existing configuration with the configuration (e.g., by overwriting an existing configuration file).

In some embodiments, server 502 may send application configuration settings in a common/normalized format (e.g., JSON) and adapters 606 may be configured to convert configuration settings from the common or shared format to application-specific formats. For example, first adapter 606*a* may convert from JSON to XML, second adapter 606*b* may convert from JSON to INT, etc.

In some embodiments, and as shown in FIG. 6, agent 602 can include a user interface (UI) 614 for reviewing configuration received from server 502. Using UI 614, a user of client 500 can provide inputs to approve or reject a configuration or individual configuration settings therein. Based on such user inputs, controller 604 can apply configuration settings to an application 608 or can discard some or all of the configuration.

Figure 7:
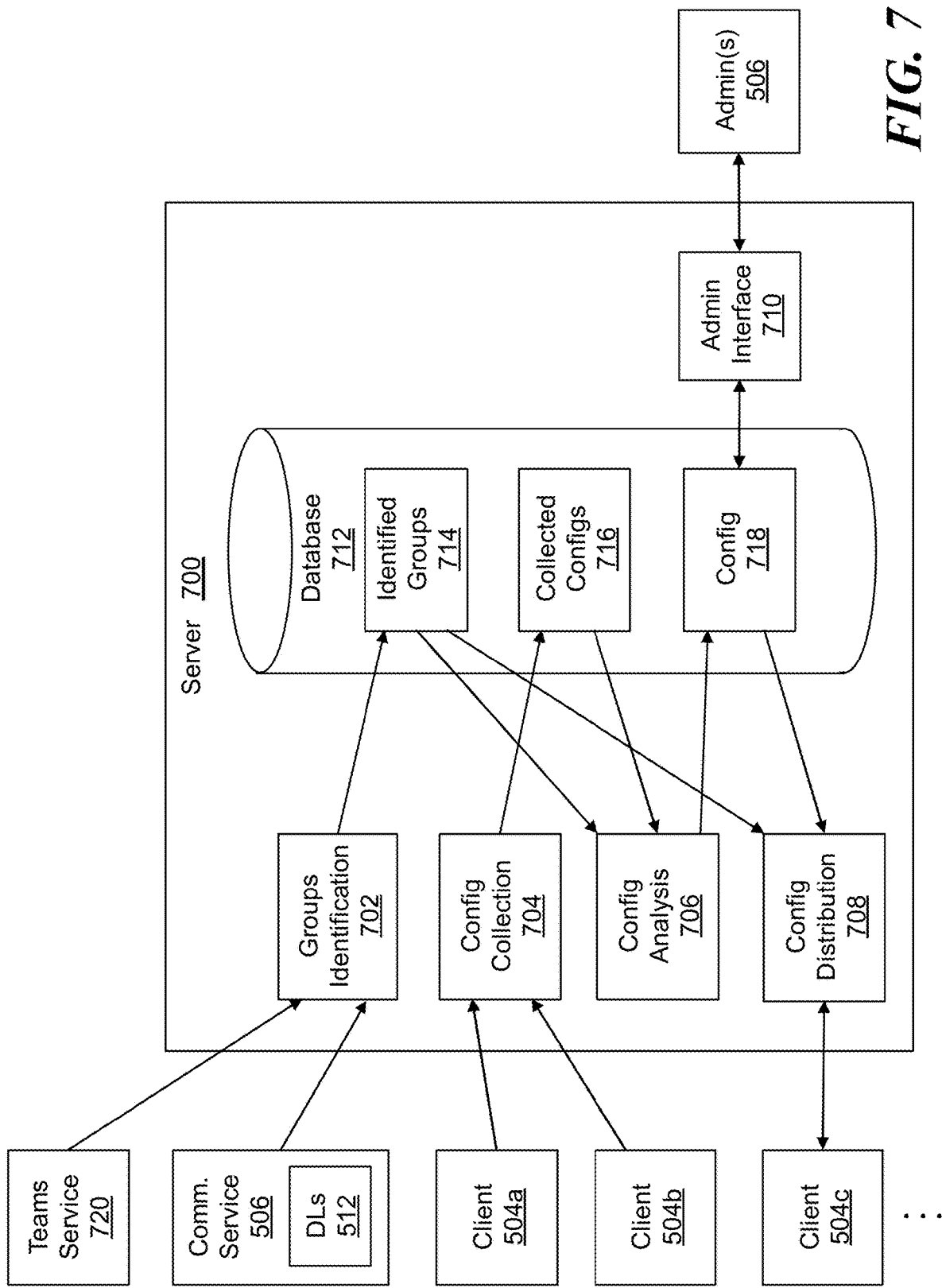
FIG. 7 is block diagram of an illustrative server that can be provided within the system of FIG. 5, according to some embodiments.

FIG. 7 shows an example of a server 700 that can be provided within a system for configuration of application software (e.g., system 500 of FIG. 5). For example, server 700 may be the same as or similar to a server 502 in FIG. 5. Illustrative server 700 includes a groups identification module 702, a configuration collection module 704, a configuration analysis module 706, a configuration distribution module 708, an administrative interface module 710, and a database 712 that stores information about application configuration. Database 712 can store, for one or more organizations, various information used to configure application software, as described in detail below. Database 712 may be provided as a relational database, key-value store, file store, or other type of database. In some embodiments, database 712 may be external to the server 700.

Groups identification module 702 is configured to identify one or more groups within an organization. As shown in FIG. 7, in some embodiments groups identification module 702 can identify groups based on distribution list (DL) information collected from a communication service 506 (e.g., EXCHANGE or another mail service). For example, groups identification module 702 can retrieve information for one or more DLs 512 such as the names of the DLs, information about the users that are belong to the DLs (e.g., names and email addresses), and information about a manager/owner of DL (e.g., the name of the DL owner). Groups identification module 702 can analyze the information retrieved for a DL to determine if the DL should be treated as a group (i.e., if the users that belong to the DL should be treated as belonging to the same group for the purpose of sharing configuration settings).

An organization may define DLs for various different purposes and those DLs may have widely varying numbers of members (i.e., users). For example, a company may define a DL that includes all employees of the company (e.g., a DL named "All Employees" having thousands of members) and another DL that includes employees working on the same project or team (e.g., a DL named "Project X" or "Team Y" having fewer than 20 members). It may be more useful and/or relevant to share application configuration among small groups of users that have similar responsibilities/roles with an organization compared to among relatively large groups of users that have different responsibilities/roles. Thus, for the purpose of identifying groups, group identification module 702 may filter the DL information retrieved from communication service 506 based on one or more criteria. For example, group identification module 702 may exclude DLs that have more than a threshold number of users (e.g., more than N users, where N is a configurable parameter). As another example, group identification module 702 may select DLs that include certain keywords in their name—such as "Project," "Team," etc.—while filtering out other DLs. As another example, group identification module 702 may filter out DLs that include certain keywords in their name, such as "All," "Employees," etc. In some embodiments, two or more such techniques can be used in combination to identify groups.

Figure 8:
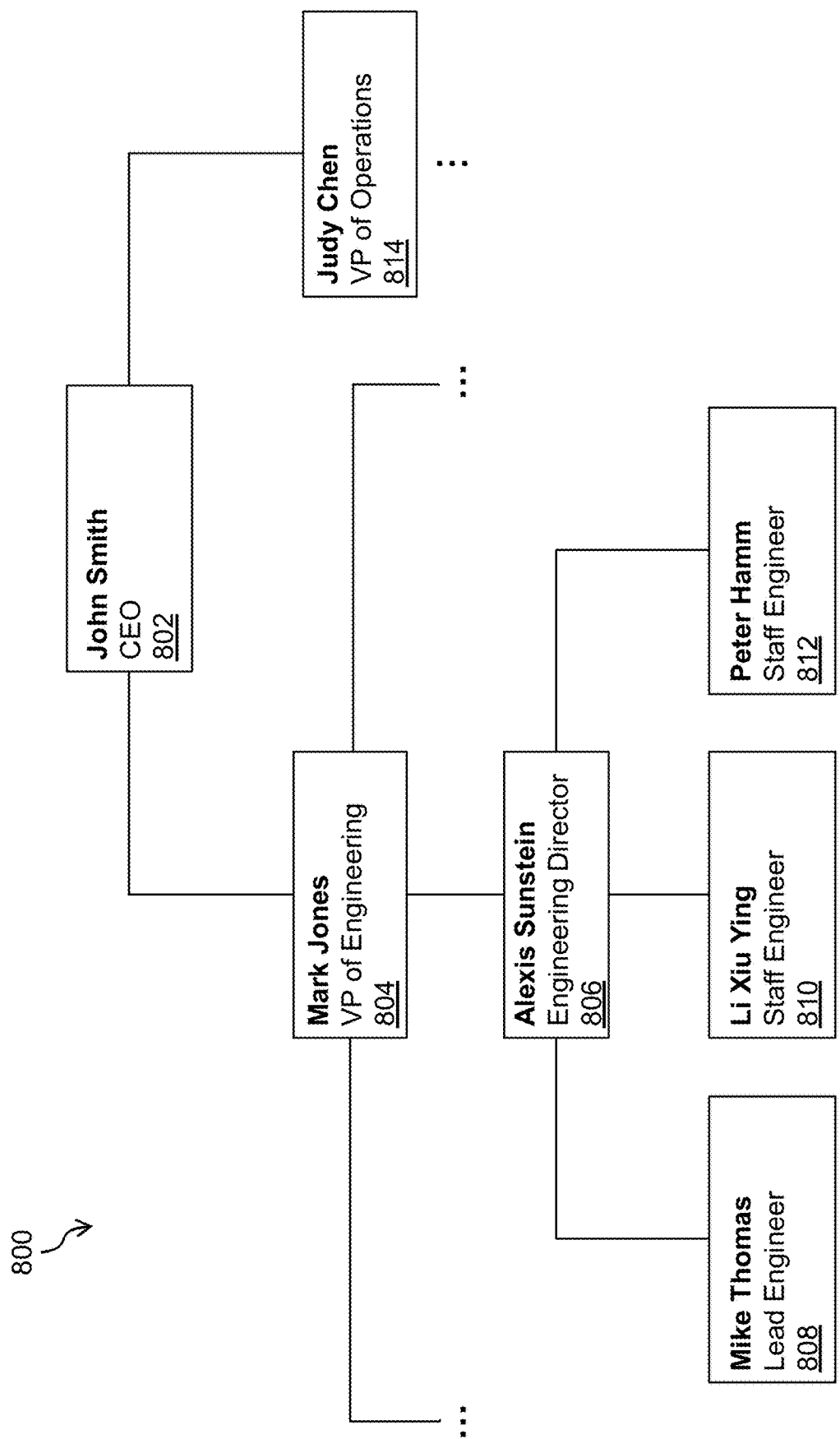
FIG. 8 is diagram of an illustrative organizational graph that can be used to identify groups of users amongst whom application configuration can be shared.

While various embodiments of the present disclosure are described as using DLs to identify groups, other techniques can be used. For example, group identification module 702 may use information about the management structure of an organization to identify groups. As shown in FIG. 7, in some embodiments group identification module 702 may retrieve an organizational graph (or "org chart") from a teams service 720 and use information with the org chart to identify users that have similar roles/job functions within an organization. An example of teams service 720 is MICROSOFT TEAMS. Turning to FIG. 8 and with continued reference to FIG. 7, an illustrative org chart 800 includes a plurality of users 802-812 organized into a hierarchy corresponding to their reporting structure with a company. For example, users 808, 810, and 812 report directly to user 806 and report indirectly to users 804, 802. In addition to indicating the reporting structure among different users, org chart 800 can include information about individual users such as a user's name and job title. Based on such information within org chart 800, group identification module 702 can identify one or more groups. For example, group identification module 702 may search a user within the org chart 800 having a particular job title and treat all of that user's direct reports and possibly that user's indirect reports as being in the same group. In the example of FIG. 8, group identification module 702 may identify users 808, 810, and 812 as a group because they report to the same "Engineering Director" (i.e., user 806) and, thus, are likely to have similar responsibilities within the organization. In contrast, a "VP of Engineering" (e.g., user 804) or a "CEO" (e.g., user 802) is likely to have reports that span many different functions within the organization and thus group identification module 702 may determine not to group those user's reports together.

Turning back to FIG. 7, groups identification module 702 can store information about identified groups within database 712, e.g., as identified group information 714. Identified group information 714 can include information about groups for one or more organizations. For a particular group, identified group information 714 can include information identifying the users within that group (e.g., a list of names or other identifiers of the users within the group) and can be stored along with an identifier for the group (e.g., a group name or numeric identifier).

Configuration collection module 704 can receive (or "collect") application configuration settings from one or more clients 504. In the example of FIG. 7, configuration collection module 704 may collect configuration settings from a first client 504a and from a second client 504b, which clients 504a, 504b may for example belong to the same group. In some embodiments, clients 504 may be configured to collect configuration settings for one or more applications accessible thereby in response to an input or event (e.g., a user launching or logging into to a resource access application on a client, or the user modifying configuration file). In some embodiments, clients 504 may be configured to collect configuration settings on a periodic basis (e.g., hourly or daily). In some embodiments, server 700 may send a message to clients 504 requesting that the clients collect and send their application configuration settings back to server 700. In some embodiments, clients 504 may send application configuration settings as part of another request to server 700. For example, when a user logs into a resource access application (e.g., resource access application 424 of FIGS. 4B and 4C) on a client 504, the application may send a request to a server (e.g., resources management services 402 in FIGS. 4A-4C) to authenticate the user. The collected application configuration settings may be included within the authentication request and forwarded to configuration collection module 704. In some embodiments, configuration collection module 704 may include an API which clients 504 can use to send collected configuration settings. In any case, the one or more clients 504 may send the collected application settings to server 700 where the settings are received and processed by configuration collection module 704.

Configuration collection module 704 can store application configuration settings collected from one or more clients 504 within database 712, e.g., as collected configuration settings 716. Collected configuration settings 716 can include configuration settings collected for one or more clients associated with one or more organizations. For a given client 504, the stored collected configuration settings 716 can include the configuration settings collected from that client along with information identifying a user associated with the client from which the settings were collected (e.g., a name or numeric identifier of the user to which the client device is assigned). In some embodiments, collected configuration settings 716 may be separated by application in addition to user. In this case, information identifying an application (e.g., a name of the application or a numeric identifier of the application) may be stored along with the configuration settings collected for that application from a particular user. Such information can be organized, for example, in one or more relational database tables indexed such that collected configuration settings 716 can be efficiently retrieved by user and/or application. In some embodiments, collected configuration settings 716 can be stored in common format (e.g., JSON). Conversion from applications-specific configuration formats to the common format may be performed by clients 504 as previously discussed, or can be performed by server-side configuration collection module 704.

Configuration collection module 704 may collect and store configuration settings from various clients 504 irrespective of which groups (if any) those clients may belong to. Configuration analysis module 706, discussed next, can be configured to compare configuration settings collected only from clients within the same group.

Configuration analysis module 706 is configured to analyze collected configuration settings 716 collected for multiple different clients within the same group and, based thereon, to generate configurations for one or more applications to be provided to other clients within that group. Configuration analysis module 706 can perform such analysis for one or more groups associated with one or more organizations. In more detail, configuration analysis module 706 can retrieve identified group information 714 from database 712 and, for one or more identified groups, configuration analysis module 706 can retrieve collected configuration settings 716 associated with users of that group. Next, configuration analysis module 706 can identify one or more applications common to the users of the group based on the retrieved collected configuration settings 716. For these applications, configuration analysis module 706 can compare configuration settings collected from different users to identify settings that are commonly used by the group. That is, configuration analysis module 706 may extract common portions of collected application configurations to generate configurations for a particular group. In some embodiments, configuration analysis module 706 may determine that a particular configuration setting should be included in a configuration if at least a threshold number or percentage of users within a group have that setting defined on their device. For example, if more than 30% of users within a group have the same configuration setting for a particular application, then that setting may be included within the generated configuration for that application (and, thus, the setting may be provided to other users in the group such that the other users may access the application in a common manner). In some embodiments, configuration analysis module 706 may determine configuration settings to be included in a configuration based on trends. For example, if more than a threshold number/percentage of users use the same configuration setting within a certain period of time, that setting may be included. A threshold number/percentage of users defined for identifying trends (i.e., configuration settings used within a given period of time) may be less than a number/percentage of users defined for identifying configuration settings with respect to time (e.g., 15% versus 30%).

In some embodiments, configuration analysis module 706 re-analyze collected configuration settings 716 for one or more groups and one or more applications. For example, configuration analysis module 706 may re-analyze collected configuration settings 716 periodically or when there is a change to the collected configuration settings 716. In this way, as more and more users within a group adopt the same configuration settings for a particular application, configuration analysis module 706 can determine that those settings should be included within a configuration provided to other users of the group.

In some embodiments, configuration analysis module 706 may detect collected configuration settings 716 that include sensitive information—such as confidential or personal information—and exclude such settings from a configuration. Configuration analysis module 706 may identify sensitive information using various techniques such as pattern matching.

Configuration analysis module 706 can store generated configurations within database 712, e.g., as a configurations 718. For a given generated configuration, stored configuration 718 may include one or more configuration settings for a particular application along with information identifying the application and the group for which the configuration was generated. Groups and applications may be identified, for example, by names or by numeric identifiers. Such information can be organized, for example, in one or more relational database tables indexed such that configurations 718 can be efficiently retrieved by group and/or application.

In some embodiments, configurations 718 can be stored in common format (e.g., JSON).

Administrative interface 710 may be configured to provide an interface by which administrators (e.g., persons using administrator devices 506) can review configurations 718. Administrative interface 710 may provide an interface for administrator devices 506 (i.e., for administrators or other users of administrator devices 506) to review configurations 718 and to accept/reject particular configurations 718 and/or individual configuration settings therein. In some embodiments, administrative interface 710 may enable administrator devices 506 to edit configurations 718 (e.g., to modify particular configuration settings). Administrative interface 710 may provide controls/functions by which an administrator device 506 can approve a configuration for a particular application and group and cause the configuration to be distributed (or "pushed") to clients within the group. In some embodiments, administrative review information can be stored along with particular configurations 718. For example, a review status field—which can have values such as "not yet reviewed," "approved" or "rejected"—may be stored along with particular configurations 718. Such administrative review information can be updated in response to inputs received by administrative interface 710, for example in response to an administrator clicking a "Approve" button.

Administrative interface 710 may include, for example, a web server configured to present a web-based UI for reviewing configurations 718. In other embodiments, administrative interface 710 may provide an API that can be used by an application running on administrator devices 506 for reviewing configurations 718. That is administrative interface 710 may directly implement a UI for reviewing configuration or it may enable external applications to implement such a UI. In either case, the UI may be the same as or similar to the illustrative UI described below in the context of FIG. 10.

In some embodiments, administrative interface 710 may provide an interface (e.g., a UI or an API) that allows administrators to build configuration templates based on the generated configurations 718 and to add comments to such templates. Such templates can be distributed to clients and applied to applications installed thereon or can be distributed and applied to servers hosting remote applications.

Configuration distribution module 708 is configured to distribute configurations 718 to one or more client 504. In the example of FIG. 7, distribute configurations 718 may distribute configurations to a third client 504c, which may be in the same group as clients 504a, 504b for which configurations settings are shown as being collected from. In practice configuration distribution module 708 may distribute configurations 718 to, for example, thousands of different clients using the techniques disclosed here. Configuration distribution module 708 may determine which group (or groups) client 504c belongs to using identified group information 714, retrieve configurations 718 associated with the determined group(s) from database 712, and send the retrieved configurations 718 to client 504c. In some embodiments, configuration distribution module 708 may only retrieve and/or distribute configurations 718 that have been approved by an administrator device 506, which it can determine using administrative review information stored along with configurations 718. In some embodiments, configuration distribution module 708 may determine one or more applications that are accessible by client 504c and retrieve configurations 718 that are associated with the accessible applications in addition to being associated with the client's group(s). Configuration distribution module 708 can determine the one or more applications accessible by client 504c in various ways. For example, client 540c may include information to identify the one or more applications in a request that it sends to configuration distribution module 708. As another example, configuration distribution module 708 may determine the accessible application using a registry of applications accessible by clients for an organization.

In some embodiments, configuration distribution module 708 can distribute application configurations in a common format such as JSON. In some embodiments, configuration distribution module 708 may distribute configuration settings for one or more applications by distribution scripts that can be executed on clients to apply configuration settings to applications installed thereon (e.g., for applications that use a non-standard configuration format that cannot readily be parsed). Such scripts can be executed by an agent running on a client, such as agent 602 of FIG. 6.

Configurations may be distributed to client 504c in response to an input or event. For example, in response to a user launching an application (e.g., a resource access application), client 504c may send a request to server 700. Configuration distribution module 708 may include an API that client 504c can use to request configurations. In turn, configuration distribution module 708 may send a response to client 504c that includes configurations for one or more applications. In some embodiments, client 504c may request configuration from configuration distribution module 708 when a user launches an application on the client 504c (e.g., the first time the application is launched on the client 504c). In this case, the request may include an identifier of the application being launched, which configuration distribution module 708 can use to retrieve and send configurations for that application. In some embodiments, configuration distribution module 708 may distribute configurations 718 to a particular client 504 only once. For example, configurations 718 may be sent to client 504c the first time the client connects to a server (e.g., resources management services 402 in FIGS. 4A-4C). In some embodiments, configuration distribution module 708 may distribute configurations 718 to client 504c in response to client 504c becoming a member of a group, e.g., the first time client 504c connects to a server after groups identification module 702 identifies the client as belonging to a new group.

In some embodiments, configuration distribution module 708 may provide configurations to client 504c in response to an unrelated request sent by client 504c. For example, in response to a user logging into an application on client 504c (e.g., resource access application 424 of FIGS. 4B and 4C), client 504c may send a request to a server (e.g., resources management services 402 in FIGS. 4A-4C) to authenticate the user. The server may invoke configuration distribution module 708 to retrieve configurations 718 and include the retrieved configurations in a response back to client 504c.

In some embodiments, configuration distribution module 708 may distribute configurations to one or more clients 504c in response to an administrator device 506 approving stored configurations 718 (e.g., in response to an administrator or other user of administrator device 506 determining that the settings with an application configuration will improve the productivity of users in a group, the efficiency of client devices associated with the group, or are otherwise suitable for distribution to the group). For example, if a configuration 718 associated with a particular group is approved, configuration distribution module 708 may determine one or more clients 504 that belong to the group and distribute (e.g., push) the approved configuration to those clients 504.

Figure 9:
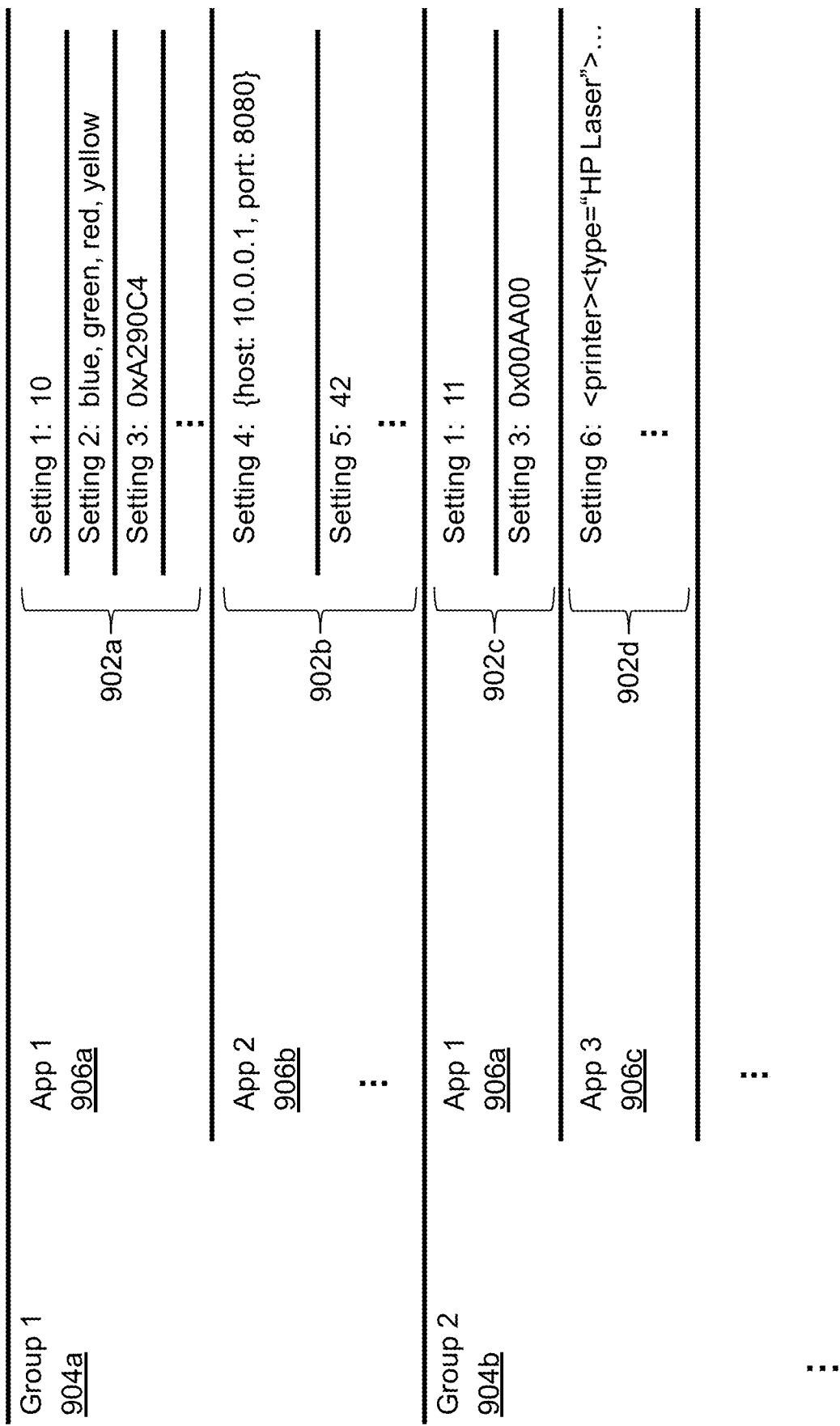
FIG. 9 is a diagram illustrating configurations that can be generated by the system of FIG. 5, according to some embodiments.

FIG. 9 shows examples of configurations 902a-902d (902 generally) that can be generated using the structures and techniques disclosed herein. For example, configurations 902 may be generated by configuration analysis module 706 of FIG. 7 and stored in database 712 of FIG. 7 as configurations 718. In the example of FIG. 9, a first configurations 902a may be associated with a first group 904a and a first application 906a, a second configurations 902b may be associated with the first group 904a and a second application 906b, a third configurations 902c may be associated with a second group 904b and the first application 906a, and a fourth configurations 902d may be associated with the second group 904b and a third application 906c.

A particular configuration 902 generally can include one or more configuration settings (e.g., names of the configuration settings and values assigned thereto) for the associated application. For example, first configuration 902a includes "Setting 1" equal to "10," "Setting 2" equal to "blue, green, red, yellow," and "Setting 3" equal to 0xA290C4. Different application configuration settings may accept (i.e., be defined in terms of) values having different data types/formats. For example, as shown in FIG. 9, "Setting 1" for first application 906a may accept numerical values (e.g., integers), "Setting 2" for first application 906a may accept a list or array of strings, "Setting 3" for first application 906a may accept a hexadecimal value, "Setting 4" for second application 906b may accept a JSON-encoded value, "Setting 6" for third application 906c may accept an XML-encoded value, etc.

A particular configuration 902 may be generated by collecting and comparing application configurations from two or more clients within the same group. For example, two or more users within first group 904a may have the value "10" defined for "Setting 1" of first application 906a, whereas two or more users within second group 904b may have the different value "11" defined for this same setting. In some embodiments, a particular application configuration setting may be included within a configuration 902 if at least a threshold number/percentage of users within a group have the same value defined for the setting.

The configurations 902a-902d shown in FIG. 9 are provided only as simple examples and, in practice, configurations can be generated for many groups (e.g., dozens or hundreds of different groups), many applications (e.g., dozens or hundreds of different applications), and may include a large number of configuration settings (e.g., dozens or hundreds of different configuration settings).

Figure 10:
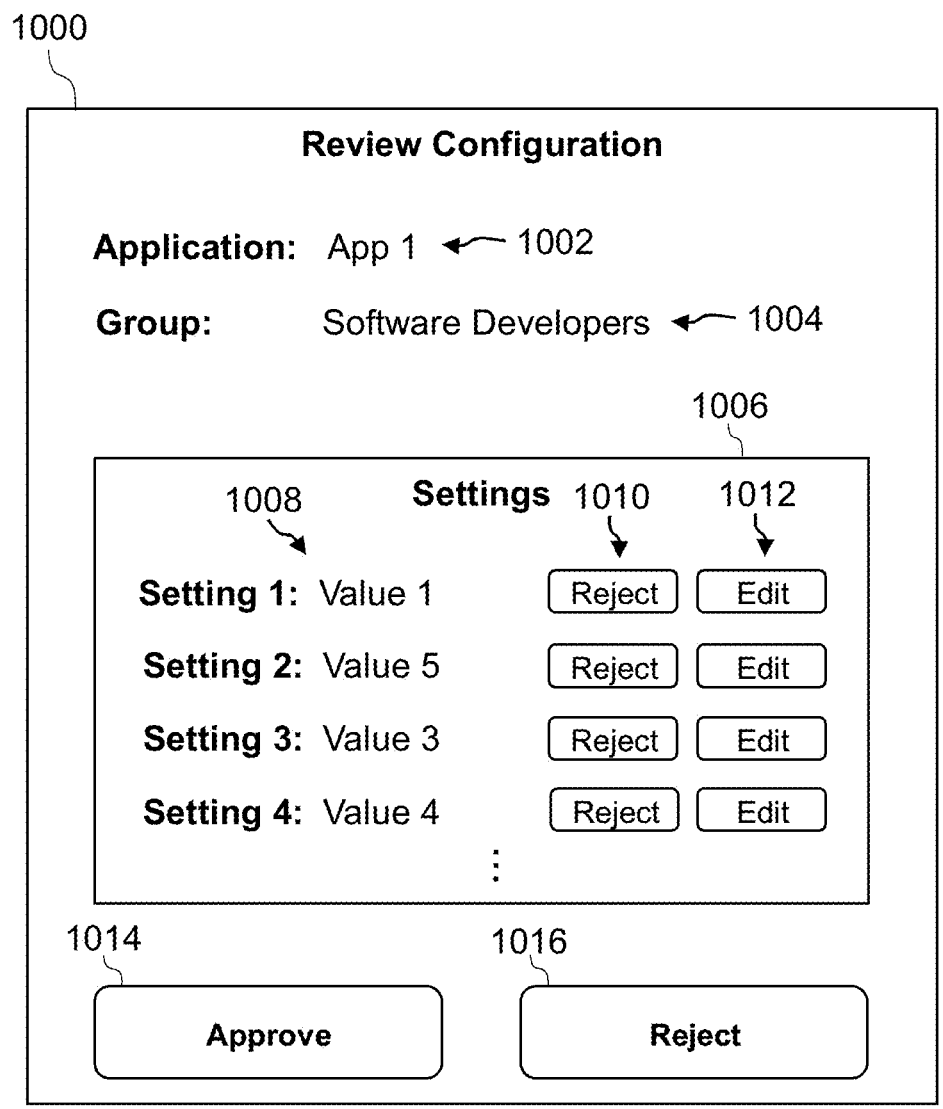
FIG. 10 is a diagram of an illustrative user interface (UI) that can be used to review configuration settings, according to some embodiments.

FIG. 10 shows an example of a user interface (UI) can be used to review configuration settings associated with an application and a group, according to some embodiments. UI 1000 can be implemented, for example, within client-side agent 602 of FIG. 2 as UI 614 and/or within server-side administrative interface 710 of FIG. 7. In some embodiments, a UI similar to UI 1000 may be implemented within an application running on an administrator device, such as administrator device 506 of FIGS. and 5 and 7.

The illustrative UI 1000 can include a label 1002 for displaying information about the application (e.g., an application name), another label 1004 for displaying information about the group (e.g., a group name), and a window or pane 1006 for displaying one or more configuration settings for the application. Pane 1006 can include one or more labels 1008 displaying the names and values of the configuration settings, one or more buttons 1010 for rejecting individual configuration settings, and one or more other buttons 1012 for editing the values of individual configuration settings. UI 1000 can also include a button 1014 for approving the configuration and another button 1016 for rejecting the configuration as whole.

Using button 1014, an administrator or other user can approve a configuration such that the settings included therein are applied to an application accessible by a client device, or multiple client devices, belonging to the group for which configuration is associated. For example, in response to a user clicking button 1014, the UI 1000 may cause a review status field, stored along with the configuration, to be set to "approved."

Using buttons 1010, an administrator or other user can reject individual configuration settings such that the rejected configurations settings are not be applied to the application when other configuration settings included within the configuration are applied. For example, if an administrator determines that a particular configuration setting includes confidential, personal, or other sensitive information, the administrator may use a button 1010 to delete that setting from the configuration. In response to a user clicking a button 1010, the UI 101 may cause a corresponding configuration setting to be deleted from the configuration. For example, UI 1000 may cause an update to database 712 of FIG. 7.

Using buttons 1012, an administrator or other user can edit the values defined for individual configuration settings. For example, if an administrator determines that an adjustment to the value of a particular configuration setting may improve the efficiency of a client device or user productivity, the administrator may use buttons 1012 to change the configuration setting to the adjusted value. In response to a user clicking a button 1010, the UI 101 may present another UI for editing the value of the configuration setting, such as that of FIG. 10A.

Figure 10A:
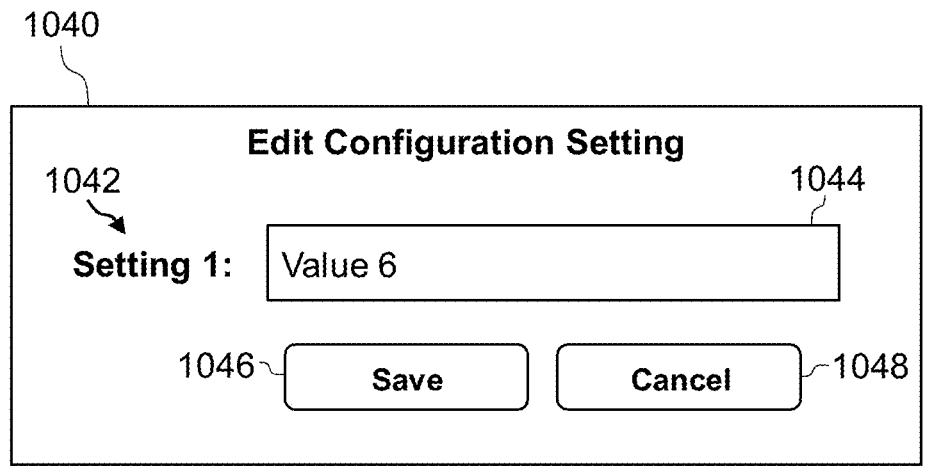
FIG. 10A is a diagram of an illustrative UI that can be used to edit configuration settings, according to some embodiments.

Turning to FIG. 10A, an illustrative UI 1040 for editing configuration settings includes a label 1042 identify a configuration setting being edited, a text input 1044 for editing the value of the configuration setting, a save button 1046, and a cancel button 1048. An administrator or other user can modify the value of the configuration setting via text input 1044. In response to the user clicking save button 1046, the UI 1040 can cause the configuration setting to be modified within the configuration. For example, UI 1040 may cause an update to database 712 of FIG. 7. If the user clicks the cancel button 1048 then the configuration is left unmodified.

Returning to FIG. 10, using button 1016, an administrator or other user can reject the configuration as a whole such that none of its settings are distributed/applied to clients within the group. In response to a user clicking button 1016, UI 1000 may cause a review status field, stored along with the configuration, to be set to "rejected." For example, UI 1014 may cause an update to database 712 of FIG. 7.

The illustrative UI 1000 shown in FIG. 10 is a simplified example of an UI that can be used to review configurations according to the present disclosure. Various other types of UIs, including graphical and text-based UIs could also be used.

FIG. 11 shows an example of a process for configuring application software, according to some embodiments. Illustrative process 1100 may be implemented within a server such as server 502 of FIG. 5 or server 700 of FIG. 7.

At block 1102, data about one or more applications associated with users of a group may be received. The group may be one in which to share information amongst the users. For example, the group may correspond to a DL of an organization. The received data may include application configuration settings collected from one or more client devices. In some embodiments, the group and the users belonging thereto may be identified based on distribution list information received from a communication service and/or an org chart received from a teams service.

At block 1104, an application common to at least a subset of users of the group may be identified based on the received data. For example, configuration settings collected from multiple client devices associated with the group may be analyzed to identify an application that is accessible by at least of subset of the client devices.

At block 1106, the settings can be provided to a client device of another user outside the subset of users. The client device may be configured to apply the settings to enable the another user to access the application in common with use of the client device (i.e., to access, using the client device, the application in a similar manner as the subset of users of the group). In some embodiments, the settings may be determined by analyzing collected configuration settings for the application to identify settings that are used by at least a threshold number of users of the group.

Figure 12:
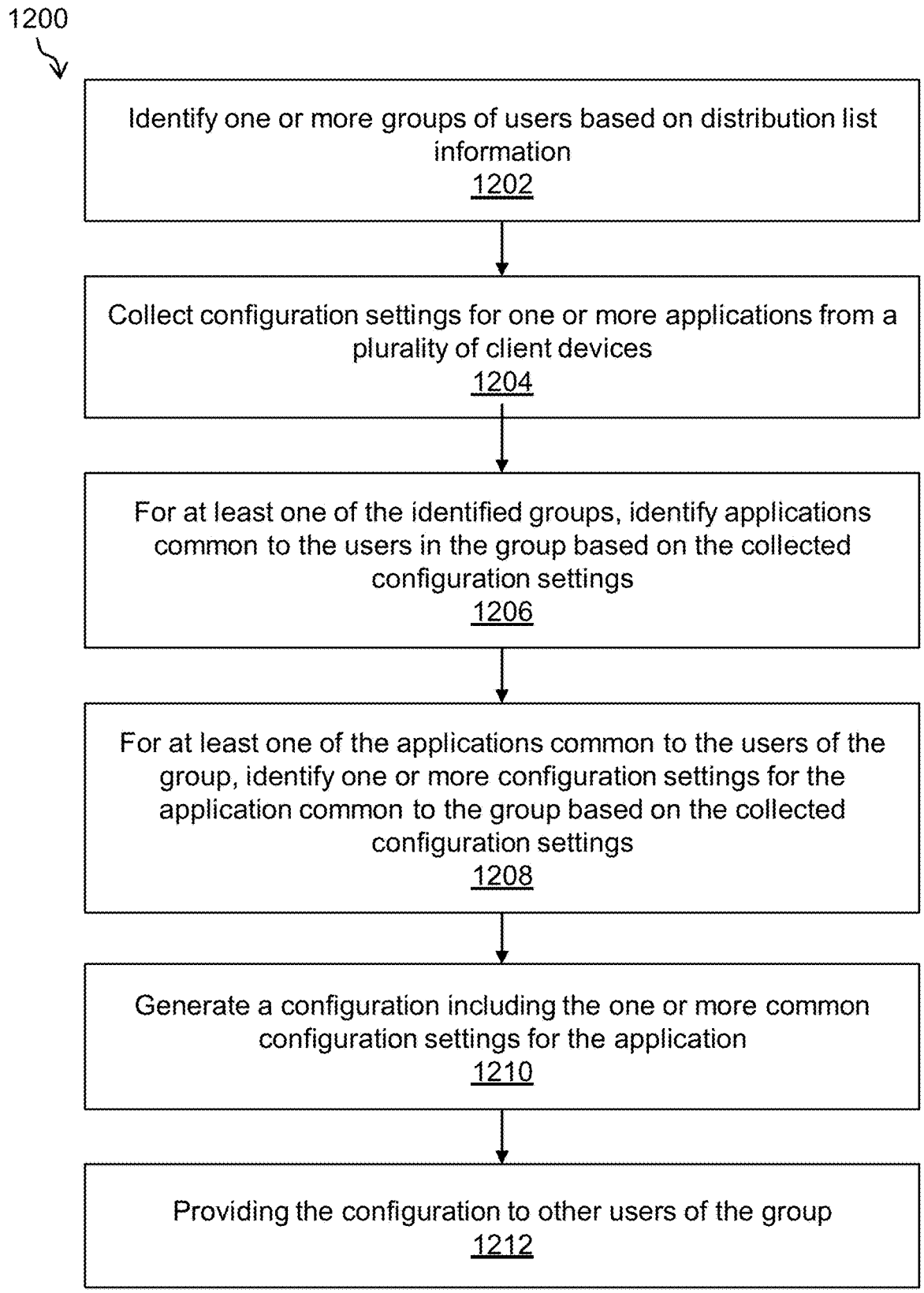

FIG. 12 shows an example of another process for configuring application software, according to some embodiments. Illustrative process 1200 may be implemented within a server such as server 502 of FIG. 5 or server 700 of FIG. 7.

At block 1202, one or more groups of users may be identified based on, for example, distribution list information received from a communication service. In other embodiments, groups can be identified based on an org chart retrieved from a teams service. In some embodiments, block 1202 may be performed by a groups identification module, such as groups identification module 702 of FIG. 7, and can include any of the previously discussed techniques for identifying teams.

At block 1204, application configuration settings may be collected from a plurality of client devices, such as client devices 504 of FIGS. 5 and 7. In some embodiments, block 1204 may be performed by a configuration collection module, such as configuration collection module 704 of FIG. 7, and can include any of the previously discussed techniques for collecting configuration settings.

At block 1206, for at least one of the identified groups, applications common to the users in the group may be identified based on the collected configuration settings. At block 1208, for at least one of the applications common to the users of the group, one or more configuration settings common to the group may also be identified based on the collected configuration settings. In some embodiments, blocks 1206 and 1208 may be performed by a configuration analysis module, such as configuration analysis module 706 of FIG. 7. Any of the previously disclosed techniques for identifying applications and configuration settings common to a group may be utilized within block 1206.

At block 1210, a configuration can be generated including the one or more common configuration settings for the application. The configuration can be stored, for example, within a database such as database 712 of FIG. 7.

At block 1212, the configuration may be provided to other users of the group. In some embodiments, block 1212 may be performed by a configuration distribution module such as configuration distribution module 708 of FIG. 8. Any of the previously disclosed techniques for providing/distributing configuration to users of a group can be utilized within block 1206.

FIG. 13 shows an example of another process for configuring application software, according to some embodiments. Illustrative process 1300 may be implemented on one or more clients such as clients 504 FIGS. 5 and 7. In some embodiments, portions of process 1300 may be implemented within an agent installed on a client device, such as agent 602 of FIG. 6.

At block 1302, a first client device associated with a user of a group may collect data about one or more applications accessible by the first client device. This can include collecting configuration settings defined for one or more application on the first client device. In some embodiments, collecting application configuration settings can be done using a control, such as controller 604 of FIG. 6, and/or adapters corresponding to the applications, such as adapters 606 of FIG. 6

At block 1304, the collected data can be sent to a server device. The server device may be configured to identify an application common to at least a subset of users of the group based on the sent data. The server device may also be configured to identify, from the collected data, one or more configuration settings common to the subset of users of the group based on the sent data. In some embodiments, the server device may be configured to generate a configuration based on the common application and associated configuration settings. The server device may distribute the configuration to other client devices associated with the group.

At block 1306, a second client device of another user outside the subset of users, may receive settings from the server device. The settings may correspond to the common application configuration settings identified by the server. At block 1308, the second client device can apply the settings to enable the another user to access the application in common with use of the second client device. Any of the previously described techniques for receiving and applying configuration at a client device can be utilized by blocks 1306 and 1308.

The following examples pertain to further embodiments, from which numerous permutations and configurations will be apparent.

Example 1 includes a method including: receiving, by a computing device, data about one or more applications associated with users of a group, the group being one in which to share information amongst the users; identifying, by the computing device, an application common to at least a subset of users of the group based on the received data; and providing, by the computing device, settings to a client device of another user outside the subset of users, the client device to apply the settings to enable the another user to access the application in common with use of the client device.

Example 2 includes the subject matter of Example 1, and further includes: receiving, by the computing device, information describing one or more lists of users from another computing device; and identifying, by the computing device, the group as being one in which to share information amongst the users and the users of the group based on the information received from the another computing device.

Example 3 includes the subject matter of Examples 1 and 2, wherein the receiving of the one or more lists of users and information describing the one or more lists of users includes receiving one or more distribution lists from a communication service.

Example 4 includes the subject matter of Examples 1 and 2, wherein the identifying of the group is based on a name of one of the one or more lists of users.

Example 5 includes the subject matter of Example 1, and further includes: receiving, by the computing device, information describing an organization of users from another computing device; and identifying, by the computing device, the group as being one in which to share information amongst the users and the users of the group based on the information received from the another computing device.

Example 6 includes the subject matter of Example 5, wherein the receiving of the information describing the organization of users includes receiving an organization graph from a teams service.

Example 7 includes the subject matter of Example 1, and further includes: identifying, by the computing device, the settings as being settings of the application common to the at least a subset of users of the group based on the received data; and determining that the at least a subset of users includes at least a threshold number of users, wherein the providing of the settings to the client device of the another user is in response to the determining.

Example 8 includes the subject matter of Example 1, and further includes: receiving, by the computing device, an input approving the settings for distribution, wherein the providing of the settings to the client device of the another user is in response to the input.

Example 9 includes the subject matter of Example 1, and further includes: identifying, by the computing device, other settings as being settings of the application common to the at least a subset of users of the group based on the received data; receiving an input rejecting the other settings for distribution; and in response to the input, updating the database to prevent the other settings from being provided to the client device of the another user.

Example 10 includes the subject matter of Example 1, wherein the receiving of the data about one or more applications associated with the users of the group includes receiving settings for the one or more applications collected by an agent running on client devices assigned to the users of the group.

Example 11 includes a method including: collecting, by a client device, data about one or more applications accessible by the client device, the client device associated with a user of a group, the group being one in which to share information amongst the users; and sending, by the client device, the data to a server device, the server device configured to: identify an application common to at least a subset of users of the group based on the sent data, and provide settings to another client device of another user outside the subset of users, the another client device to apply the settings to enable the another user to access the application in common with use of the another client device.

Example 12 includes the subject matter of Example 11, wherein the server device is further configured to: identify the settings as being settings of the application common to the at least a subset of users of the group based on the sent data; and determine that the at least a subset of users includes at least a threshold number of users, wherein the providing of the settings to the another client device of the another user is in response to the determining.

Example 13 includes the subject matter of Example 11, and further includes: receiving, by the client device and from the server device, other settings associated with another application common to at least another subset of the users; applying the other settings to the another application accessible by the client device to enable the user to access the another application in common with use of the client device.

Example 14 includes the subject matter of Example 13, and further includes: receiving, by the client device, an input approving the other settings, wherein the applying of the other settings to the client device is in response to the input.

Example 15 includes the subject matter of Example 11, wherein collecting the data about one or more applications accessible by the client device is by an agent running on the client device.

Example 16 includes an apparatus including a processor; and a non-volatile memory storing computer program code that when executed on the processor causes the processor to execute a process. The process includes: receiving, by a computing device, data about one or more applications associated with users of a group, the group being one in which to share information amongst the users; identifying, by the computing device, an application common to at least a subset of users of the group based on the received data; and providing, by the computing device, settings to a client device of another user outside the subset of users, the client device to apply the settings to enable the another user to access the application in common with use of the client device.

Example 17 includes the subject matter of Example 16, wherein the process further includes: receiving, by the computing device, information describing one or more lists of users from another computing device; and identifying, by the computing device, the group as being one in which to share information amongst the users and the users of the group based on the information received from the another computing device.

Example 18 includes the subject matter of Example 17, wherein the receiving of the one or more lists of users and information describing the one or more lists of users includes receiving one or more distribution lists from a communication service.

Example 19 includes the subject matter of Example 16, wherein the identifying of the group is based on a name of one of the one or more lists of users.

Example 20 includes the subject matter of Example 16, wherein the process further includes: receiving, by the computing device, information describing an organization of users from another computing device; and identifying, by the computing device, the group as being one in which to share information amongst the users and the users of the group based on the information received from the another computing device.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A method comprising:
receiving, by a computing device, data about one or more applications associated with users of a group, the group being one in which to share information amongst the users;
identifying, by the computing device, settings of an application common to at least a subset of users of the group based on the received data;
determining a percentage of users within the group who have the settings of the application defined on their devices; and
in response to the determined percentage being greater than a threshold percentage, providing, by the computing device, the settings to a client device of another user outside the subset of users, the client device to apply the settings to enable the another user to access the application in common with use of the client device;
identifying, by the computing device, other settings as being settings of the application common to the at least a subset of users of the group based on the received data;
receiving, via an administrative interface, an input rejecting one or more of the other settings for distribution, the administrative interface comprising controls for rejecting individual ones of the other settings and for approving the other settings that are not rejected; and
in response to the input, updating a database to prevent the one or more rejected other settings from being provided to client devices of users outside the subset of users.

2. The method of claim 1, further including:
receiving, by the computing device, information describing one or more lists of users from another computing device; and
identifying, by the computing device, the group as being one in which to share information amongst the users and the users of the group based on the information received from the another computing device.

3. The method of claim 2, wherein the receiving of the one or more lists of users and information describing the one or more lists of users includes receiving one or more distribution lists from a communication service.

4. The method of claim 2, wherein the identifying of the group is based on a name of one of the one or more lists of users.

5. The method of claim 1, further including:
receiving, by the computing device, information describing an organization of users from another computing device; and
identifying, by the computing device, the group as being one in which to share information amongst the users and the users of the group based on the information received from the another computing device.

6. The method of claim 5, wherein the receiving of the information describing the organization of users includes receiving an organization graph from a teams service.

7. The method of claim 1, wherein the threshold percentage is 30%.

8. The method of claim 1, further including:
receiving, by the computing device, an input approving the settings for distribution,
wherein the providing of the settings to the client device of the another user is in response to the input.

9. The method of claim 1, wherein the receiving of the data about one or more applications associated with the users of the group includes receiving settings for the one or more applications collected by an agent running on client devices assigned to the users of the group.

10. A method comprising:
collecting, by a client device, data about one or more applications accessible by the client device, the client device associated with a user of a group, the group being one in which to share information amongst the users; and sending, by the client device, the data to a server device, the server device configured to:
identify settings of an application common to at least a subset of users of the group based on the sent data,
determine a percentage of users within the group who have the settings of the application defined on their devices, and
in response to the determined percentage being greater than a threshold percentage, provide the settings to another client device of another user outside the subset of users, the another client device to apply the settings to enable the another user to access the application in common with use of the another client device;
identifying, by the computing device, other settings as being settings of the application common to the at least a subset of users of the group based on the received data;
receiving, via an administrative interface, an input rejecting one or more of the other settings for distribution, the administrative interface comprising controls for rejecting individual ones of the other settings and for approving the other settings that are not rejected; and
in response to the input, updating a database to prevent the one or more rejected other settings from being provided to client devices of users outside the subset of users.

11. The method of claim 10, wherein the threshold percentage is 30%.

12. The method of claim 10, further including:
receiving, by the client device and from the server device, other settings associated with another application common to at least another subset of the users; and
applying the other settings to the another application accessible by the client device to enable the user to access the another application in common with use of the client device.

13. The method of claim 12, further including:
receiving, by the client device, an input approving the other settings,
wherein the applying of the other settings to the client device is in response to the input.

14. The method of claim 10, wherein collecting the data about one or more applications accessible by the client device is by an agent running on the client device.

15. An apparatus comprising:
a processor; and
a non-volatile memory storing computer program code that when executed on the processor causes the processor to execute a process comprising:
receiving, by a computing device, data about one or more applications associated with users of a group, the group being one in which to share information amongst the users;
identifying, by the computing device, settings of an application common to at least a subset of users of the group based on the received data;
determining a percentage of users within the group who have the settings of the application defined on their devices; and
providing, by the computing device, the settings to a client device of another user outside the subset of users, the client device to apply the settings to enable the another user to access the application in common with use of the client device;
identifying, by the computing device, other settings as being settings of the application common to the at least a subset of users of the group based on the received data;
receiving, via an administrative interface, an input rejecting one or more of the other settings for distribution, the administrative interface comprising controls for rejecting individual ones of the other settings and for approving the other settings that are not rejected; and
in response to the input, updating a database to prevent the one or more rejected other settings from being provided to client devices of users outside the subset of users.

16. The apparatus of claim 15, wherein the process further includes:
receiving, by the computing device, information describing one or more lists of users from another computing device; and
identifying, by the computing device, the group as being one in which to share information amongst the users and the users of the group based on the information received from the another computing device.

17. The apparatus of claim 16, wherein the receiving of the one or more lists of users and information describing the one or more lists of users includes receiving one or more distribution lists from a communication service.

18. The apparatus of claim 16, wherein the identifying of the group is based on a name of one of the one or more lists of users.

19. The apparatus of claim 15, wherein the process further includes:
receiving, by the computing device, information describing an organization of users from another computing device; and
identifying, by the computing device, the group as being one in which to share information amongst the users and the users of the group based on the information received from the another computing device.

* * * * *